US010523490B2

(12) United States Patent
Conway

(10) Patent No.: US 10,523,490 B2
(45) Date of Patent: *Dec. 31, 2019

(54) AUTHENTICATION OF A SUBSCRIBED CODE TABLE USER UTILIZING OPTIMIZED CODE TABLE SIGNALING

(71) Applicant: AgilePQ, Inc., San Diego, CA (US)

(72) Inventor: Bruce Conway, Williston, ND (US)

(73) Assignee: AgilePQ, Inc., South Jordan, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 14/243,438

(22) Filed: Apr. 2, 2014

(65) Prior Publication Data

US 2015/0043668 A1    Feb. 12, 2015

Related U.S. Application Data

(60) Provisional application No. 61/862,745, filed on Aug. 6, 2013.

(51) Int. Cl.
*H04L 27/34* (2006.01)
*H04L 1/00* (2006.01)

(52) U.S. Cl.
CPC ............ *H04L 27/345* (2013.01); *H04L 1/009* (2013.01); *H04L 1/0042* (2013.01)

(58) Field of Classification Search
CPC ........ H04W 12/04; H04L 63/06; H04L 27/00; H04L 27/27; A01B 12/006
See application file for complete search history.

(56) References Cited

U.S. PATENT DOCUMENTS 723,188 A    3/1903  Tesla
725,605 A    4/1903  Tesla
(Continued)

FOREIGN PATENT DOCUMENTS

EP    1 521 414 B1    4/2005
WO    WO-00/11845 A1    3/2000
(Continued)

OTHER PUBLICATIONS

Cooper and McGillen,"Modern Communications and Spread Spectrum" McGraw-Hill 1986 pp. 268-411.
Inglis, ed. "Electronic Communcations Handbook" McGraw-Hill, 1988; pp. 22.1-22.19.
Rohde and Bucher, "Communications Receivers" McGraw-Hill, 1988; pp. 462-471.
Schilling, Pickholtz and Milstein, "Spread Spectrum goes Commercial", IEEE Spectrum, Aug. 1990, pp. 40-45.
Brennan, "Linear Diversity Combining Techniques", Proc. of the IRE, Jun. 1959, pp. 1075-1102.
(Continued)

*Primary Examiner* — Berhanu Tadese
(74) *Attorney, Agent, or Firm* — Eversheds Sutherland (US) LLP

(57) ABSTRACT

In various embodiments, a computer-implemented method enabling and maintaining authentication of a sender-receiver pair for a communication system by applying changes to the parameters of OCTS is disclosed. In one embodiment, a computer-implemented method comprises receiving, by a processor, a digital bit stream and transforming, by the processor, the digital bit stream to an encoded digital bit stream. The encoded digital bit stream comprises at least one of a gateway channel, a composite channel, or a data channel, and any combination thereof. The computer-implemented method further comprises providing, by the processor, the encoded digital bit stream to a transmission system for transmission and establishing, by the processor, authentication of the sender-receiver pair where pre-coordinated, pre-distributed information may be changed and communicated to limit the transmission to an intended sender-receiver pair. The intended sender-receiver pair comprises both the pre-coordinated, pre-distributed information and the changed coordinated, distributed information.

19 Claims, 18 Drawing Sheets

(56) References Cited

U.S. PATENT DOCUMENTS

| | | | |
|---|---|---|---|
| 3,296,532 A | 1/1967 | Robinson | |
| 3,305,781 A | 2/1967 | Robinson | |
| 3,350,646 A | 10/1967 | Graziano | |
| 3,699,450 A | 10/1972 | Rainal | |
| 3,917,935 A | 11/1975 | Lazecki | |
| 4,030,067 A | 6/1977 | Howell et al. | |
| 4,494,238 A | 1/1985 | Groth, Jr. | |
| 4,528,550 A | 7/1985 | Graves et al. | |
| 4,623,999 A | 11/1986 | Patterson | |
| 4,628,517 A | 12/1986 | Schwarz et al. | |
| 4,630,288 A | 12/1986 | Longstaff et al. | |
| 4,649,541 A | 3/1987 | Lahmeyer | |
| 4,694,455 A | 9/1987 | Koga | |
| 4,731,799 A | 3/1988 | Longstaff et al. | |
| 4,733,401 A | 3/1988 | Longstaff | |
| 4,747,103 A | 5/1988 | Iwamura et al. | |
| 4,849,975 A | 7/1989 | Patel | |
| 4,933,956 A | 6/1990 | Forney, Jr. | |
| 4,958,349 A | 9/1990 | Tanner et al. | |
| 5,150,381 A | 9/1992 | Forney et al. | |
| 5,331,320 A | 7/1994 | Cideciyan et al. | |
| 5,548,819 A | 8/1996 | Robb | |
| 5,577,087 A | 11/1996 | Furuya | |
| 5,612,651 A | 3/1997 | Chethik | |
| 5,786,780 A * | 7/1998 | Park | H03M 7/42 341/67 |
| 5,799,088 A | 8/1998 | Raike | |
| 5,931,966 A | 8/1999 | Carley | |
| 5,970,097 A | 10/1999 | Ishikawa et al. | |
| 6,084,969 A | 7/2000 | Wright et al. | |
| 6,085,340 A | 7/2000 | Postol | |
| 6,223,320 B1 | 4/2001 | Dubey et al. | |
| 6,247,159 B1 | 6/2001 | Shih et al. | |
| 6,553,535 B1 | 4/2003 | Asada et al. | |
| 6,571,368 B1 | 5/2003 | Chen | |
| 6,715,076 B1 * | 3/2004 | Challapali | H04N 7/162 348/E7.056 |
| 6,731,692 B1 * | 5/2004 | Bhoja | H04L 1/0041 375/264 |
| 6,771,824 B1 * | 8/2004 | Chiu | H03M 7/42 375/E7.144 |
| 6,788,696 B2 | 9/2004 | Allan et al. | |
| 6,925,126 B2 | 8/2005 | Lan et al. | |
| 7,000,106 B2 | 2/2006 | Carter | |
| 7,095,707 B2 * | 8/2006 | Rakib | H03M 13/256 348/E7.07 |
| 7,106,228 B2 | 9/2006 | Bessette et al. | |
| 7,197,094 B2 | 3/2007 | Tung | |
| 7,197,689 B2 | 3/2007 | Hekstra et al. | |
| 7,277,507 B2 | 10/2007 | Takagi | |
| 7,295,624 B2 | 11/2007 | Onggosanusi et al. | |
| 7,301,983 B1 | 11/2007 | Horne | |
| 7,376,105 B2 | 5/2008 | Asada et al. | |
| 7,400,689 B2 | 7/2008 | Matsumoto et al. | |
| 7,492,807 B1 | 2/2009 | Buchmann et al. | |
| 7,571,316 B2 | 8/2009 | Onno et al. | |
| 7,680,670 B2 | 3/2010 | Lamblin et al. | |
| 7,895,046 B2 * | 2/2011 | Andersen | G10L 19/04 704/219 |
| 7,970,215 B2 | 6/2011 | Haque et al. | |
| 7,990,891 B2 | 8/2011 | Lu et al. | |
| 8,005,460 B2 | 8/2011 | Chen et al. | |
| 8,077,534 B2 | 12/2011 | Arsovski et al. | |
| 8,149,810 B1 | 4/2012 | Narasimhan et al. | |
| 8,194,558 B2 | 6/2012 | Choi et al. | |
| 8,219,737 B2 | 7/2012 | Rofougaran | |
| 8,254,484 B2 | 8/2012 | Kim et al. | |
| 8,307,184 B1 | 11/2012 | Nissani (Nissensohn) et al. | |
| 8,320,473 B1 * | 11/2012 | Conway | H03M 7/3082 341/106 |
| 8,473,812 B2 | 6/2013 | Ramamoorthy et al. | |
| 8,539,318 B2 | 7/2013 | Cronie et al. | |
| 8,503,559 B2 | 8/2013 | Au-Yeung et al. | |
| 8,571,223 B2 * | 10/2013 | Du | H04L 9/083 380/278 |
| 8,634,450 B2 | 1/2014 | Vidal et al. | |
| 8,677,215 B2 | 3/2014 | Ramamoorthy et al. | |
| 8,718,170 B2 | 5/2014 | Nissani (Nissensohn) et al. | |
| 8,829,984 B2 | 9/2014 | Batruni | |
| 8,831,159 B2 | 9/2014 | Itkin | |
| 8,855,028 B2 | 10/2014 | Kim | |
| 8,955,069 B1 * | 2/2015 | Dotan | H04L 63/0861 726/6 |
| 8,984,609 B1 * | 3/2015 | Juels | G06F 21/34 726/9 |
| 9,031,156 B2 * | 5/2015 | Conway | H03M 13/611 375/295 |
| 9,078,126 B2 * | 7/2015 | Yi | H04L 9/0841 |
| 9,118,661 B1 * | 8/2015 | Juels | H04L 63/0853 |
| 9,203,556 B2 | 12/2015 | Conway | |
| 9,225,717 B1 * | 12/2015 | Brainard | H04L 63/0846 |
| 9,270,655 B1 * | 2/2016 | Juels | H04L 9/12 |
| 9,350,545 B1 * | 5/2016 | Triandopoulos | H04L 9/321 |
| 9,407,631 B1 * | 8/2016 | Triandopoulos | H04L 63/0838 |
| 9,432,360 B1 * | 8/2016 | Triandopoulos | H04L 63/0838 |
| 9,444,580 B2 | 9/2016 | Conway | |
| 9,454,654 B1 * | 9/2016 | Triandopoulos | G06F 21/31 |
| 9,455,799 B2 | 9/2016 | Conway | |
| 9,515,989 B1 * | 12/2016 | Juels | H04L 63/065 |
| 9,698,940 B2 | 7/2017 | Conway | |
| 9,774,349 B2 * | 9/2017 | Conway | H03M 13/611 |
| 9,832,649 B1 * | 11/2017 | Curran | H04W 12/08 |
| 9,900,126 B2 | 2/2018 | Conway | |
| 10,056,919 B2 | 8/2018 | Conway et al. | |
| 10,200,062 B2 | 2/2019 | Conway | |
| 10,361,716 B2 | 7/2019 | Conway et al. | |
| 2001/0048683 A1 | 12/2001 | Allan et al. | |
| 2002/0110196 A1 * | 8/2002 | Nguyen | H04N 1/41 375/240.22 |
| 2002/0191712 A1 * | 12/2002 | Gaddam | H04L 1/0041 375/301 |
| 2003/0037232 A1 * | 2/2003 | Bailiff | G06F 21/6263 713/153 |
| 2003/0137438 A1 | 7/2003 | Yokose | |
| 2004/0019546 A1 * | 1/2004 | Ta | G06F 21/10 705/35 |
| 2004/0019564 A1 * | 1/2004 | Goldthwaite | G06Q 20/04 705/44 |
| 2004/0030734 A1 | 2/2004 | Wells et al. | |
| 2004/0088640 A1 | 5/2004 | Lin et al. | |
| 2004/0153291 A1 | 8/2004 | Kocarev et al. | |
| 2004/0179685 A1 | 9/2004 | Soliman | |
| 2004/0203456 A1 | 10/2004 | Onggosanusi et al. | |
| 2004/0203600 A1 * | 10/2004 | McCorkle | G01S 7/023 455/411 |
| 2005/0204038 A1 * | 9/2005 | Medvinsky | G06F 21/10 709/225 |
| 2006/0056538 A1 * | 3/2006 | Nam | H04L 1/0643 375/298 |
| 2006/0170571 A1 | 8/2006 | Martinian et al. | |
| 2006/0248337 A1 * | 11/2006 | Koodli | H04L 63/0272 713/171 |
| 2006/0291661 A1 * | 12/2006 | Ramzan | H04L 9/0844 380/277 |
| 2007/0058808 A1 * | 3/2007 | Rudolf | H04L 9/0841 380/44 |
| 2007/0162236 A1 | 7/2007 | Lamblin et al. | |
| 2007/0198837 A1 * | 8/2007 | Koodli | H04L 63/0272 713/171 |
| 2007/0201632 A1 | 8/2007 | Ionescu | |
| 2008/0013724 A1 * | 1/2008 | Shamoon | H04L 63/0428 380/201 |
| 2008/0071847 A1 | 3/2008 | Cho et al. | |
| 2009/0168868 A1 * | 7/2009 | Jahanghir | H03M 7/4006 375/240.02 |
| 2009/0221252 A1 * | 9/2009 | Cheung | H03G 3/3078 455/234.1 |
| 2009/0285126 A1 | 11/2009 | Lu et al. | |
| 2010/0232495 A1 * | 9/2010 | Citta | H03M 13/00 375/240.01 |

(56) References Cited

U.S. PATENT DOCUMENTS

| | | | |
|---|---|---|---|
| 2010/0309793 A1* | 12/2010 | Choi | H04L 1/0016 370/252 |
| 2011/0289576 A1* | 11/2011 | Cheng | G09C 1/00 726/9 |
| 2011/0302478 A1* | 12/2011 | Cronie | H03M 5/04 714/777 |
| 2012/0059968 A1 | 3/2012 | Rogougaran | |
| 2012/0201337 A1 | 8/2012 | Itkin | |
| 2012/0288094 A1* | 11/2012 | Batruni | H04K 1/00 380/255 |
| 2013/0003808 A1 | 1/2013 | Depta | |
| 2013/0282940 A1* | 10/2013 | Depta | G06F 13/426 710/106 |
| 2015/0043344 A1* | 2/2015 | Conway | H04L 1/0052 370/231 |
| 2015/0043621 A1 | 2/2015 | Conway | |
| 2015/0043668 A1* | 2/2015 | Conway | H04L 27/345 375/265 |
| 2015/0043677 A1* | 2/2015 | Conway | H03M 13/611 375/296 |
| 2015/0195060 A1 | 7/2015 | Conway | |
| 2015/0349921 A1 | 12/2015 | Conway | |
| 2016/0254877 A1 | 9/2016 | Conway | |
| 2016/0380648 A1* | 12/2016 | Conway | H03M 13/611 341/51 |
| 2017/0353302 A1 | 12/2017 | Fernandez et al. | |

FOREIGN PATENT DOCUMENTS

| | | | |
|---|---|---|---|
| WO | WO-0180525 A1 * | 10/2001 | ............ G06F 21/43 |
| WO | WO-2004/098067 A1 | 11/2004 | |
| WO | WO-2006/049419 A1 | 5/2006 | |
| WO | WO-2006049419 A1 * | 5/2006 | ........... H04L 27/263 |
| WO | WO2006049419 | 11/2006 | |
| WO | WO-2007/035148 A2 | 3/2007 | |
| WO | WO-2009/132601 A1 | 11/2009 | |
| WO | WO-2015/020737 A1 | 2/2015 | |
| WO | WO-2016/004185 A1 | 1/2016 | |

OTHER PUBLICATIONS

Tiuri, "Radio Astronomy Receivers" IEEE Trans. Antennas and Propagation AP-12 (7) Dec. 1964, pp. 930-938.

Lookup Table, Wikipedia, retrieved from http://web.archive.org/web/20140621081859/http://en.wikipedia.org/wiki/Lookup_table, Jun. 21, 2014, 5 pages.

U.S. Appl. No. 14/863,075, filed Sep. 23, 2015.

International Search Report & Written Opinion dated Aug. 9, 2017 in Int'l PCT Patent Appl. Serial No. PCT/US2017/036002.

Alkim, et al., Post-quantum key exchange—a new hope, 2015(32 pages).

Currie, R., Developments in Car Hacking, SANS Institute, InfoSec Reading Room, Accepted Dec. 5, 2015 (33 pages).

International Search Report & Written Opinion dated Oct. 2, 2014 in Int'l PCT Patent Appl. Serial No. PCT/US2014/044661.

"Lookup table," Wikipedia, the free encyclopedia, Jun. 21, 2016 (pp. 1-5); Retrieved from the Internet: URL:http://web.archive.org/web/20140621081859/http//en.wikipedia.org/wiki/Lookip_table [retrieved on Sep. 7, 2015].

Agrawal, Shweta et al., "On the Secrecy Rate of Interference Networks Using Structured Codes," University of Texas, Austin, May 13, 2009.

Belfiore, Jean-Claude, et al., "Secrecy Gain: a Wiretap Lattice Code Design," Department of Communications and Electronics, TELECOM ParisTech, Paris, France, Jul. 8, 2010.

Boutros, Joseph, et al., "Good Lattice Constellations for Both Rayleigh Fading and Gaussian Channels," IEEE Transactions on Information Theory, vol. 42, No. 2, Mar. 1996 (pp. 502-518).

Conway, John H., et al., "A Fast Encoding Method for Lattice Codes and Quantizers," IEEE Transactions on Information Theory, vol. IT-29, No. 6, Nov. 1983 (pp. 820-824).

Forney, D. David Jr., "Coset Codes—Part I: Introduction and Geometrical Classification." IEEE Transactions on Information Theory, vol. 34, No. 5, Sep. 1988 (pp. 1123-1151).

Goeckel, Dennis L., "Adaptive Coding for Time-Varying Channels Using Outdated Fading Estimates," IEEE Transactions on Communications, vol. 47, No. 6, Jun. 1999 (pp. 844-855).

Goldsmith, Andrea J., "Adaptive Coded Modulation for Fading Channels," IEEE Transactions on Communications, vol. 46, No. 5, May 1998 (pp. 595-602).

Goldsmith, Andrea, "Wireless Communications," Stanford University, Copyright 2005 by Cambridge University Press.

He, Xiang, et al., "Providing Secrecy with Lattice Codes," Forty-Sixth Annual Allerton Conference, Allerton House, UIUC, Illinois, USA, Sep. 23-26, 2008 (pp. 1199-1206).

He, Xiang, et al., "Providing Secrecy With Structure Codes: Tools and Applications to Two-User Gaussian Channels," Jul. 30, 2009.

Khandani, A. K., et al., "Shaping of Multi-dimensional Signal Constellations Using a Lookup Table," Proc. IEEE Int. Conf. Commun. (Chicago, IL), Jun. 1992 (pp. 927-931).

Kim, Taejoon, et al., "Differential Rotation Feedback MIMO System for Temporally Correlated Channels," Global Telecommunications Conference, 2008. IEEE GLOBECOM 2008. IEEE, Nov. 30, 2008-Dec. 4, 2008.

Kurkoski, Brian M., "The E8 Lattice and Error Correction in Multi-Level Flash Memory," University of Electro-Communications, Tokyo, Japan, Feb. 16, 2011.

Lang, Gordon R., et al., "A Leech Lattice Modem," IEEE Journal on Selected Areas in Communications, vol. 7, No. 6, Aug. 1989 (pp. 968-973).

Ling, Cong, et al., "Semantically Secure Lattice Codes for the Gaussian Wiretap Channel," IEEE Transactions on Information Theory, vol. 60, No. 10, Oct. 2014 (pp. 6399-6416).

Mansour, Mohamed F., "Efficient Huffman Decoding with Table Lookup," Acoustics, Speech and Signal Processing, 2007. ICASSP 2007. IEEE International Conference (downloaded Apr. 6, 2016).

Mondal, Bishwarup, et al., "Channel Adaptive Quantization for Limited Feedback MIMO Beamforming Systems," IEEE Transactions on Signal Processing, vol. 54, No. 12, Dec. 2006 (p. 4717-4729).

Oggier, Frederique et al., "Lattice Codes for the Wiretap Gaussian Channel: Construction and Analysis," Jan. 9, 2013.

Ostergaard, Jan et al., "Source-Channel Erasure Codes with Lattice Codebooks for Multiple Description Coding," ISIT 2006, Seattle, USA, Jul. 9-14, 2006.

PCT International Search Report and Written Opinion dated Sep. 15, 2015 in Int'l PCT Patent Application No. PCT/US2015/038802.

Rhee, Duho et al., "Adaptive Modulation and Coding on Multipath Rayleigh Fading Channels Based on Channel Prediction," Advanced Communication Technology, 2006. ICACT 2006. The 8th International Conference, vol. 1, Feb. 20-22, 2006 (pp. 195-199).

University of Wyoming, Department of Mathematics, Fall 2005, Bitstreams & Digital Dreams "Error-Correcting Codes," (downloaded Apr. 6, 2016).

Viterbo, Emanuele et al., "Algebraic Number Theory and Code Design for Rayleigh Fading Channels," Publishers Inc., 2004 (pp. 5-18, 21-26, 63-71).

Viterbo, Emanuele, "Tecniche matematiche computazionali per l'analisi ed it progetto di costellazioni a reticolo," Feb. 23, 1995.

Viterbo, Emanuele, et al. "A Universal Lattice Code Decoder for Fading Channels," IEEE Transactions on Information Theory, vol. 45, No. 5, Jul. 1999 (pp. 1639-1642).

* cited by examiner

AUTHENTICATION OF A SUBSCRIBED CODE TABLE USER UTILIZING OPTIMIZED CODE TABLE SIGNALING

CROSS-REFERENCE TO RELATED APPLICATIONS

The present application claims the benefit, under 35 U.S.C. § 119(e), of U.S. Provisional Application Ser. No. 61/862,745, filed Aug. 6, 2013, the disclosure of which is incorporated herein by reference in its entirety.

The present application is related to previously-filed U.S. patent application Ser. No. 14/062,535, filed on Oct. 24, 2013, titled OPTIMIZED DATA TRANSFER UTILIZING OPTIMIZED CODE TABLE SIGNALING and U.S. patent application Ser. No. 14/099,180, filed on Dec. 6, 2013, titled ENHANCED SIGNAL INTEGRITY AND COMMUNICATION UTILIZING OPTIMIZED CODE TABLE SIGNALING", each of which is incorporated by reference in their entireties.

The present application is also related to the concurrently-filed U.S. patent application Ser. No. 14/243,426, titled DYNAMIC CONTROL OF QUALITY OF SERVICE (QOS) USING DERIVED QOS MEASURES, now published as U.S. Patent Application Publication No. 2015/0043344, which is incorporated by reference herein in its entirety.

TECHNICAL FIELD

The disclosure generally relates to the field of communication systems, particularly to a data communication system utilizing optimized code table signaling.

BACKGROUND

Various data communication schemes are available for radio communication systems. Modulation techniques (e.g., analog or digital modulation) may be utilized in such communication schemes. In addition, encoding and decoding processes may also be utilized to improve the signal integrity of the data being communicated.

SUMMARY

The present disclosure is directed to data communication systems and methods. In various embodiments, the method applies optimized code table signaling (OCTS) to a digital data stream for the purpose of optimizing its transfer, adapting to a digital communications network, and operating independent of industry and regulatory standards for input digital bit stream and transmission methods.

A further embodiment comprises applying OCTS to an analog bit stream that has been digitized for the purpose of optimizing the bit stream's transfer, adapting to a communications method selected for transmission of digitized analog signals, and operating independent of industry and regulatory standards for input digitized analog signal stream and transmission methods.

The present disclosure is also directed to data communication systems and methods. In various embodiments, the method applies optimized code table signaling (OCTS) to a digital data stream for the purpose of enhancing signal integrity and communication, adapting to a digital communications network, and operating independent of industry and regulatory standards for input digital bit stream and transmission methods.

A further embodiment comprises applying OCTS to an analog bit stream that has been digitized for the purpose of enhancing signal integrity and communication of the bit stream, adapting to a communications method selected for transmission of digitized analog signals, and operating independent of industry and regulatory standards for input digitized analog signal stream and transmission methods.

The present disclosure is also directed to methods that enable dynamic control of the communication system's Quality of Service (QOS) through the use of derived QOS measures by applying changes to the parameters of optimized code table signaling for a digital data stream.

A further embodiment comprises enabling dynamic control of the communication system's QOS through the use of derived QOS measures by applying changes to the parameters of OCTS to an analog bit stream that has been digitized.

The present disclosure is also directed to methods that enable authentication of a subscribed user within the network to communicate with an individual within the network for whom the network is intended.

A further embodiment comprises enabling authentication of a subscribed user within the network to communicate with a server within the network where the server is communicating as one to many and the individual recipients may authenticate to communicate back to the server.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The novel features of the embodiments described herein are set forth with particularity in the appended claims. The embodiments, however, both as to organization and methods of operation may be better understood by reference to the following description, taken in conjunction with the accompanying drawings as follows:

DETAILED DESCRIPTION

Reference will now be made in detail to several embodiments, including embodiments showing example implementations of systems and methods for OCTS-expanded data communications. Wherever practicable similar or like reference numbers may be used in the figures and may indicate similar or like functionality. The figures depict example embodiments of the disclosed systems and/or methods of use for purposes of illustration only. One skilled in the art will readily recognize from the following description that alternative example embodiments of the structures and methods illustrated herein may be employed without departing from the principles described herein.

Optimized Code Table Signaling

Figure 1:
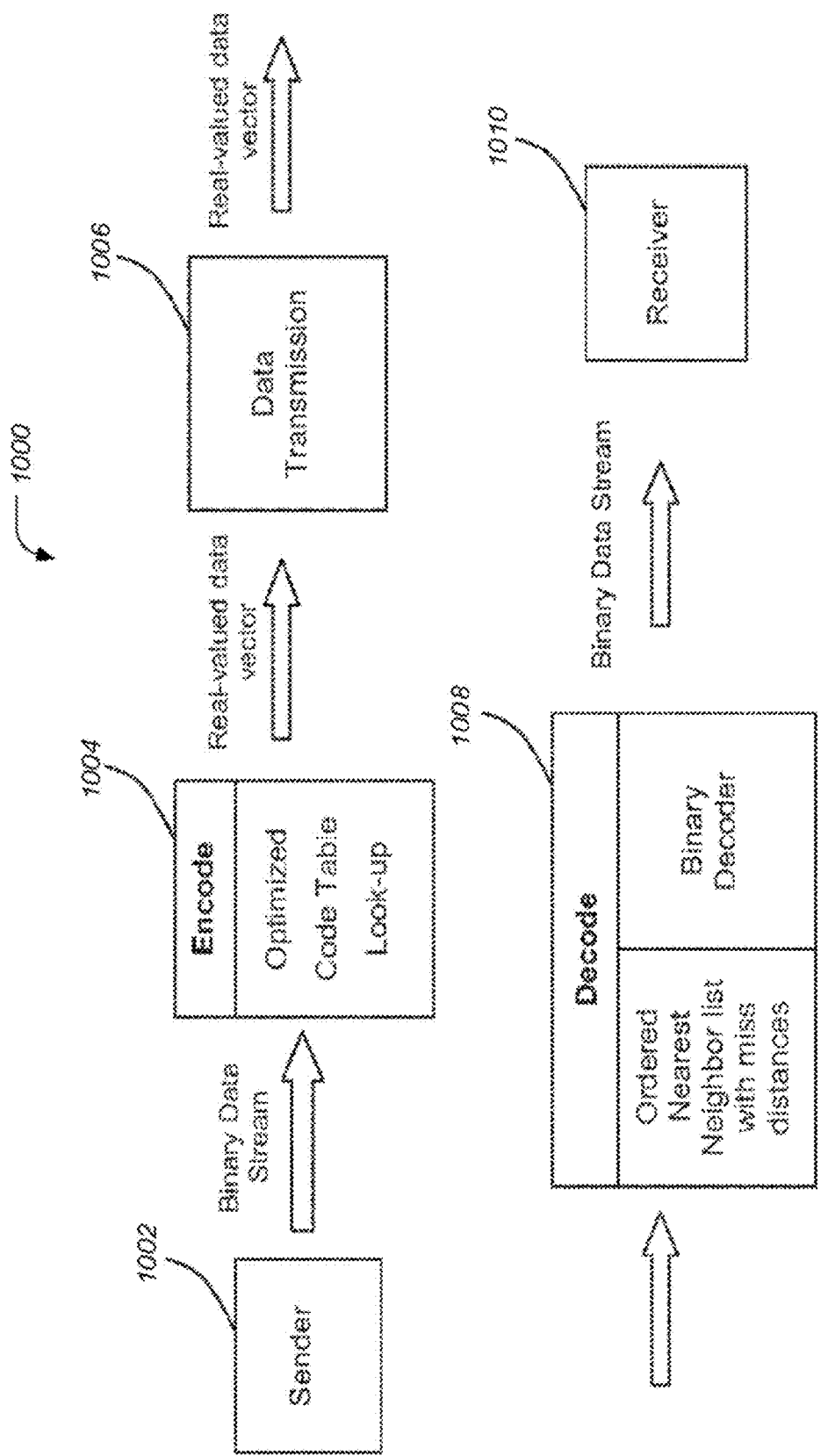
FIG. 1 illustrates a block diagram of one embodiment of a data communication system for transmitting data from one or more senders to one or more receivers.

FIG. 1 illustrates one embodiment of an Optimized Code Table Signaling (OCTS) process. The OCTS process provides encoding of binary inputs to multi-valued vectors that are presented to the modulator and transmitter, and provides the reverse process of converting the received multi-value vector to a binary output vector. By judicious choice of the OCTS table, the parameters of Bit Error Rate (BER), realized data throughput, bit energy, signal range, and signal integrity may be managed dynamically to provide optimized performance and/or enhanced signal integrity and communication. OCTS is described in U.S. Pat. No. 8,320,473, issued on Nov. 27, 2012, and entitled "DATA COMMUNICATION SYSTEM UTILIZING OPTIMIZED CODE TABLE SIGNALING," which is hereby incorporated by reference in its entirety. Extension to OCTS are described in U.S. patent application Ser. No. 14/062,535, filed on Oct. 24, 2013, entitled "OPTIMIZED DATA TRANSFER UTILIZING OPTIMIZED CODE TABLE SIGNALING."

FIG. 1 shows a block diagram illustrating steps performed by a data communication system/method 1000 implementing OCTS. The data communication system 1000 is utilized for transmitting data from one or more senders 1002 to one or more receivers 1010. The data communication system 1000 is configured to utilize the mapping of a binary bit stream to real-valued vectors, where the mapping functions are determined based on the characteristics/properties of the communication path/environment.

In one embodiment, upon receiving data from a sender 1002, step 1004 transforms (encodes) the received data into a vector of real numbers (which may be referred to as a real-valued data vector). For example, each n-bit binary word may be transformed into a set of m real-valued numbers. The transformation is calculated in real-time for each binary word based on the mapping function, or performed as a lookup in a pre-computed table. For example, in one embodiment, Trellis Coded Modulation (TCM) is utilized for transforming a sequence of n-bit binary words into a sequence of m real-valued numbers based on the pre-computed table.

The number (m) of real-valued numbers utilized to represent an n-bit binary word may vary based on the properties of the communication path/environment. For example, in one embodiment, fewer than 6 real-valued numbers are utilized to represent a 6-bit binary word in a less noisy environment. In another embodiment comprising a noisy environment, a 6-bit binary word may be transformed into a set of 6 (or more) real-valued numbers. Those skilled in the art will understand that a small m value (the number of real-valued numbers used to represent an n-bit binary word) increases transmission capacity, while a larger m value provides better performance in a noisy environment. The specific values of n and m may be determined base on one or more properties of the communication environment, such as, for example, noise level, bit error rate, signal integrity, and/or other properties.

A transmitter 1006 transmits the transformed real-value data vector to a receive side. Standard communication mechanism, such as, for example, radio communication technologies comprising analog and/or digital module and/or spread spectrum techniques, may be utilized for the transmission. For example, in one embodiment, Quadrature Amplitude Modulation (QAM) is utilized for transmission of the transformed real-value data vector from the sender side to the receiver side.

Upon receipt of the real-valued data vector on the receiver side, the received real-valued data vector is transformed (decoded) 1008 into the computer-readable format originally sent by the sender 1002. In one embodiment, the decoding process 1008 is performed as a table lookup for each set of m real-valued numbers to locate the n-bit binary word represented by the given set of m real-valued numbers. For example, for each set of m real-valued numbers, the decoding process 1008 locates an element in the lookup table that has the smallest Euclidian distance away from this set of m real-valued numbers. Thus, the n-bit binary word that corresponds to this element in the lookup table is the n-bit binary word represented by the set of m real-valued numbers.

Once the transformation 1008 of the real-valued data vector into data represented in a computer readable-medium format is completed, the computer-readable data is transmitted to the receiver 1010. It will be appreciated that additional signal integrity is provided by transmitting the encoded real-valued data vectors instead of the original binary data stream. Since the transformation table (or code table) is not shared with a third party, decoding of the intercepted real-valued data vector (by the third party) into the format originally sent by the sender may be prevented and/or deferred. In some embodiments, the sender 1002 and the receiver 1010 both comprise a pool of potential code tables suitable for performing the encoding and decoding. The sender 1002 informs the receiver 1010 of the specific code table utilized for encoding via a table identifier, such as, for example, acknowledging a table identifier as part of a handshake process and/or sending the identifier as part of the data transmission. The table identifier may not be meaningful to the third party intercepting the transmission.

In some embodiments, the performance of the data communication system 1000 is determined by the attributes of the code tables, which may be optimized based on the properties of the communication environment. The code tables may not be unique for mapping an n-bit binary word to a set of real-valued numbers. In one embodiment, the selection criteria for a suitable code table comprises: 1) having a maximum distance between the data vectors while maintaining the maximum power in the data vectors and using the same dynamic range within each column; and 2) providing an acceptable encoding and decoding performance, for example, above a predetermined threshold.

Figure 2:
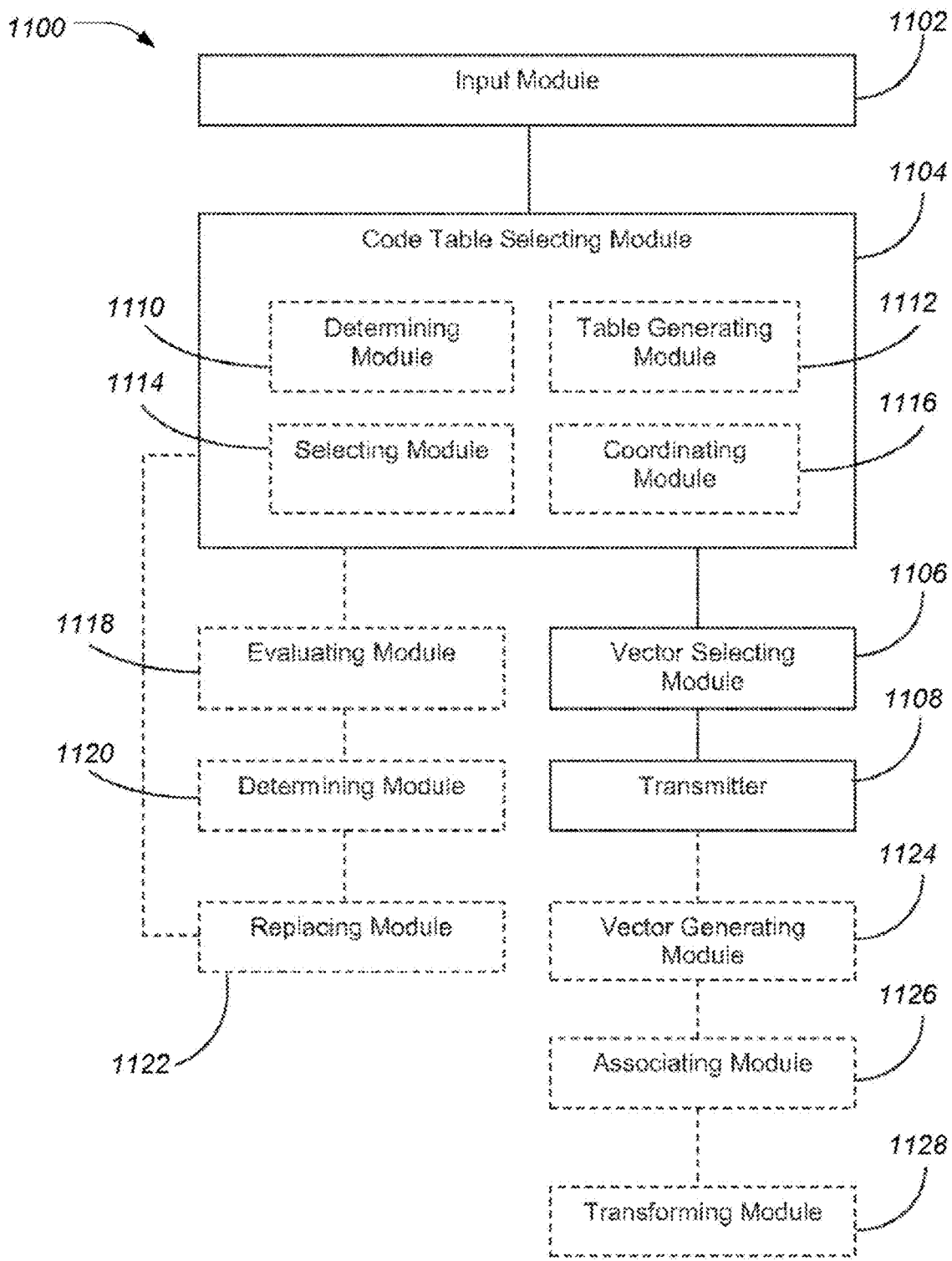
FIG. 2 illustrates a block diagram of one embodiment of data communication system for transmitting data.

FIG. 2 illustrates a block diagram of a communication system 1100. The data communication system 1100 may comprise: an input module 1102 for obtaining a data vector to be communicated; a code table selecting module 1104 for selecting a code table configured to facilitating said data communication; a vector selecting module 1106 for selecting a vector of real numbers representative of said data vector from said code table, for example, utilizing Trellis Coded Modulation; and a transmitter 1108 for transmitting the vector of real numbers to a receiver. The vector of real numbers is transformed, upon reception, into a best corresponding vector by utilizing the code table as previously described.

In one embodiment, the code table selecting module 1104 comprises a determining module 1110 for determining at least one of a communication characteristic of a communication environment, a desired level of signal integrity, a desired data throughput level, or any combination thereof. The code table selecting module 1104 selects the code table at least partially based upon at least one of said communication characteristic of the communication environment, desired level of signal integrity, desired data throughput level, or any combination thereof.

In some embodiments, the code table selecting module 1104 includes a table generating module 1112 for creating a plurality of candidate code tables, each of the plurality of candidate code tables having real-valued data entries. The code table selecting module 1104 selects the code table from the plurality of candidate code tables based on an evaluation criterion. For example, in one embodiment, the evaluation criterion is based on at least one characteristic of the communication environment, such as, for example, noise level, bit error rate, signal integrity, and/or other properties. In another embodiment, the evaluation criterion comprises a minimum separation distance for a given candidate code table.

In some embodiments, the code table selecting module 1104 comprises a selecting module 1114 for selecting a code table from a set of preconfigured code tables. Each preconfigured code table of the set of preconfigured code tables is associated with a performance metric to facilitate the selection process. Once a selection is made, a coordinating module 1116 coordinates the code table selected with at least one receiver.

In some embodiments, the data communication system 1100 comprises an evaluating module 1118 for evaluating a performance and/or signal integrity metric of the code table. A determining module 1120 is configured to determine whether the performance and/or signal integrity can be improved if the current code table is replaced with a new code table. If the performance and/or signal integrity can be improved, a replacing module 1122 replaces the current code table with the new code table, and the new code table is utilized for subsequent data communications.

As previously mentioned, the receiver is configured for transforming the vector of real numbers received into a best corresponding vector by utilizing the code table. In one embodiment, the receiver comprises: a vector generating module 1124 for creating a set of candidates for the best corresponding vector; an associating module 1126 for associating each candidate of the set of candidates with a confidence value, the confidence value for each candidate is determined based on a separation distance between the candidate and the vector of real numbers calculated utilizing the code table; and a transforming module 1128 for transforming the vector of real numbers into the candidate with the best confidence value. In some embodiments, the receiver comprises a storage device configured for storing the best corresponding vector.

In some embodiments, code table generation algorithms are driven by a seed value passed into a pseudorandom number generator. By using a random number generator that creates an identical string of pseudorandom numbers given an identical seed, the code table generation algorithms will generate an identical code table given an identical seed. A code table may be identified by a unique identifier within a naming scheme and/or by a seed value. In some embodiments, the code table algorithms require two or more seed values, each for unique functions within the code table generation algorithm. When multiple seed values are used, an exhaustive search of a code table space driven by creating an exhaustive list of code tables becomes prohibitively complex. In some embodiments, code table generation comprises a three-step process, consisting of table creation, table evaluation, and table partitioning.

In some embodiments, a full set of code table output vectors is referred to as a code table signal constellation. Given a pair of n-element output vectors $x=(x_1, x_2, \ldots, x_n)$ and $y=(y_1, y_2, \ldots, y_n)$, the mean free Euclidian distance (MFED) between vectors x and y is given by the equation:

$$MFED(x, y) = \sqrt{\sum_{i=1}^{n} (x_i - y_i)^2}$$

The first order driver of the noise rejection properties of a code table is the minimum MFED (min MFED) across all output vector pairs. Given two code tables, the code table with the largest minimum MFED can be predicted to have the fewest errors given identical signal to noise ratio (SNR) environments. In some embodiments, the minimum MFED serves as a table metric. In embodiments comprising sparsely populated tables ($q^n \gg 2^m$), the minimum MFED provides a useful metric. In embodiments comprising fully populated tables, the minimum MFED may be constant from table to table and therefore does not provide a useful metric.

In some embodiments comprising sparsely populated code tables, a table creation process generates a search algorithm to generate candidate code tables and to evaluate each of the candidate code tables with a code table metric. For example, in one embodiment, if a table is very sparsely populated, a table generator spreads the signal constellation apart to generate better candidates as compared to a signal constellation with a more uniform spread. In another embodiment comprising a fully populated code table, the minimum MFED may be identical in all cases. In this embodiment, the table generator is configured to maintain mapping from a single random number seed to a specific and repeatedly generated code table.

Figure 3:
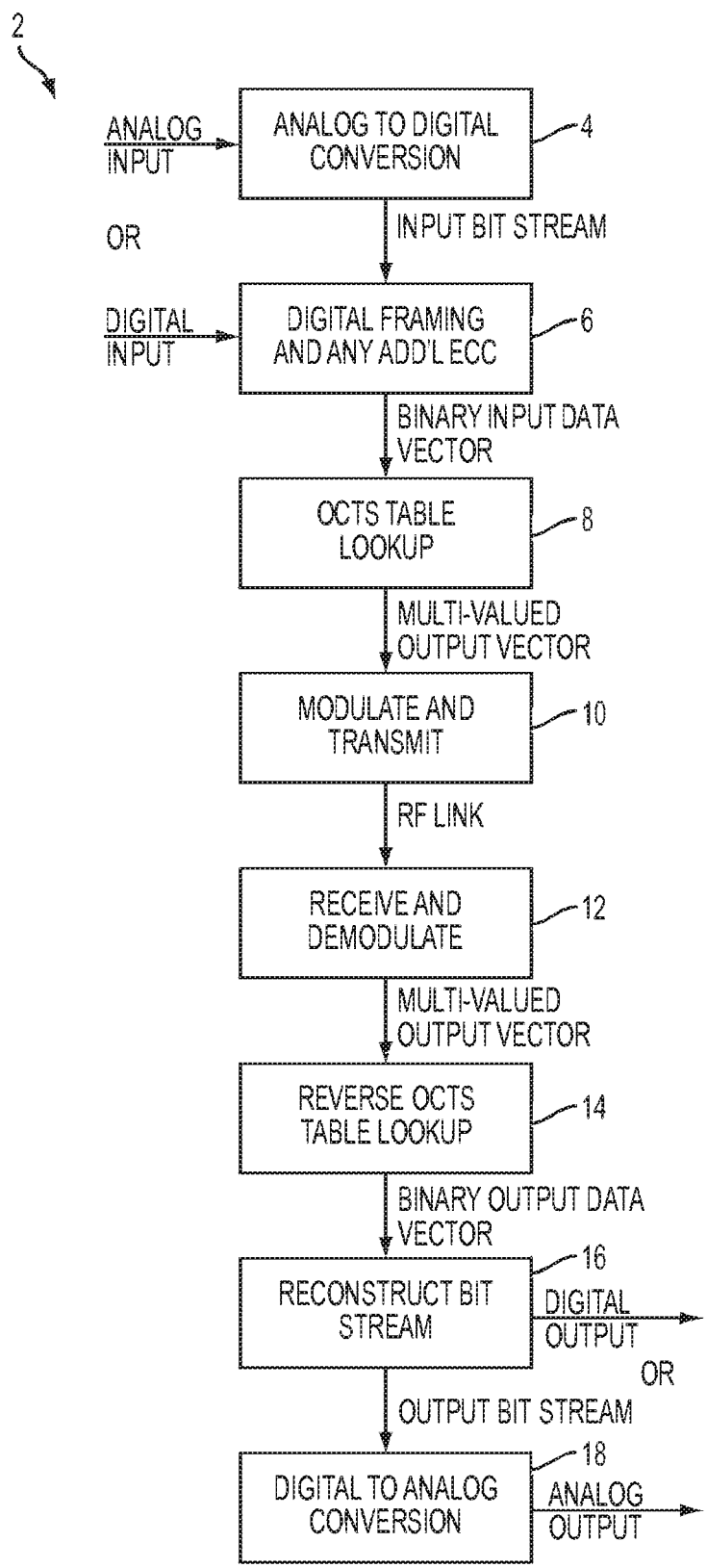
FIG. 3 illustrates one embodiment of an OCTS process.

FIG. 3 illustrates one embodiment of an OCTS information flow. An analog input is converted 4 to a digital bit stream. A digital frame and additional error control coding (ECC) 6 is applied to the digital bit stream. A binary input vector is provided to an OCTS table lookup 8. The OCTS table lookup 8 produces a multi-valued output vector, which is provided for modulation and transmission 10. The modulated signal is transmitted over a radiofrequency channel and is received and a demodulated 12 at a destination. The demodulated multi-valued output vector is provided for reconstruction of the bit stream 16. In some embodiments, a digital output is provided. In other embodiments, the digital bit stream is converted 18 into an analog output. The multi-valued output vectors that comprise the output of the OCTS table lookup and the input to the reverse OCTS table lookup in FIG. 1 may comprise binary vectors in and out of a conventional digital communications system.

Figure 4:
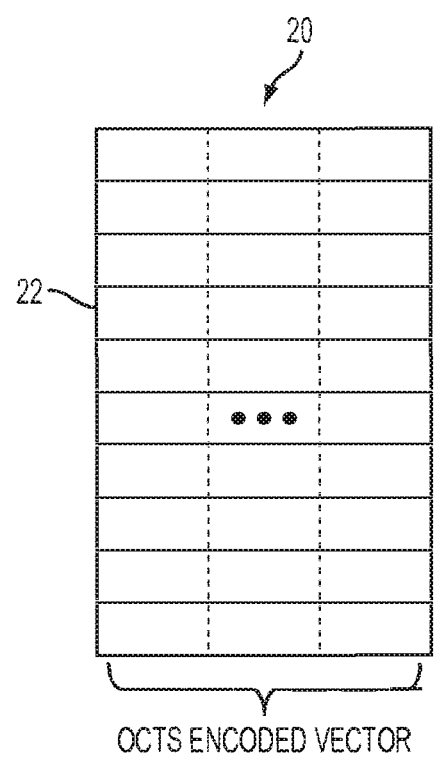
FIG. 4 illustrates one embodiment of an OCTS table.
Figure 5:
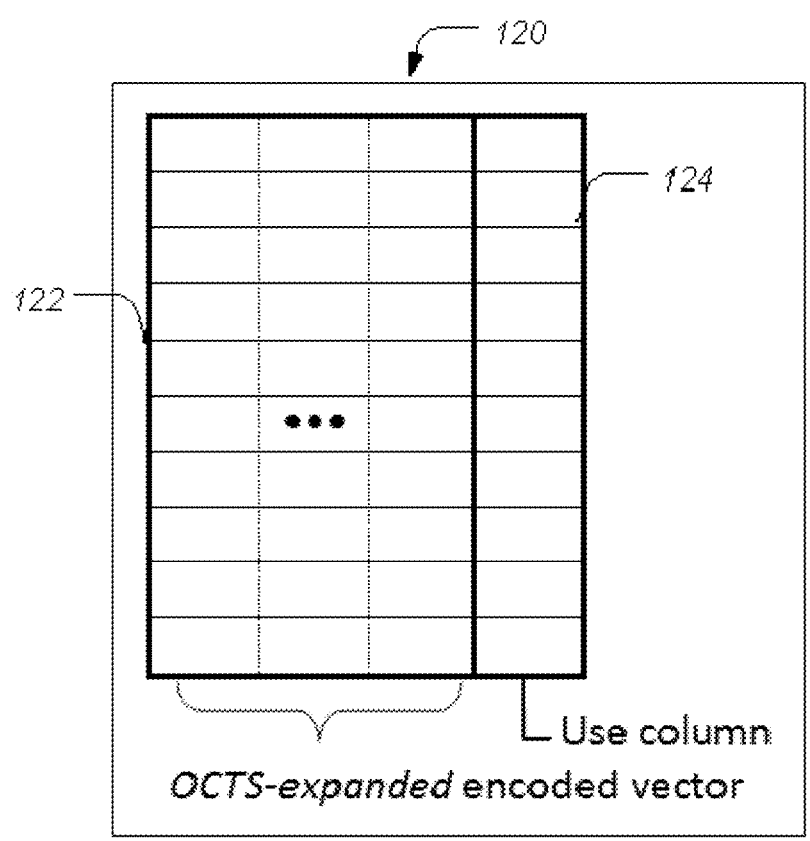
FIG. 5 illustrates one embodiment of an OCTS-expanded table.

An OCTS-expanded process provides the means to manage many of the tasks of OCTS and expands the utility of OCTS as an industry-standards agnostic interface to an existing digital communications system. In some embodiments, an OCTS-expanded table comprises an addition of a column to the OCTS table indicating the expanded use of each encoded vector. FIG. 4 illustrates one embodiment of a standard OCTS table. FIG. 5 illustrates one embodiment of an OCTS-expanded table comprising an additional column. In some embodiments, one or more internal OCTS-expanded control channels are included for the OCTS-expanded process. As illustrated in FIG. 4, a traditional OCTS table 20 comprises one or more OCTS encoded vectors 22. The OCTS-expanded table 120, illustrated in FIG. 5, comprises one or more OCTS encoded vectors 122 and further comprises a use column 124. The use column 124 identifies the use of a vector within the OCTS-expanded table 120.

In some embodiments, OCTS-expanded processing requires two independent channels, denoted as the Gateway Channel and the Composite Channel. The Gateway Channel allows a member user into a protected communication system, limited to the specific signal stream and recipient that have pre-coordinated and pre-distributed information. The Composite Channel provides message and control functions. Each channel requires its own code table, denoted as the Gateway Code Table and the Composite Code Table. In some embodiments, the encoded Gateway Channel output vectors are interleaved with the encoded Composite Channel output vectors into a single pipe. The interleaving provides an additional measure of complexity to the signal stream that may be used for additional functions beyond enhanced signal integrity and communication.

In some embodiments, the Gateway Channel establishes signal integrity by virtue of the use of pre-distributed information, such as, for example, pre-coordinated information and message manipulation functions. The Gateway Channel provides the signal integrity function and identifies the current Composite Channel OCTS configuration. The Gateway Channel may provide the function and configuration by for example, a multi-part message comprises a first part to provide the signal integrity and a second part to identify the current Composite Channel configuration. The Gateway Channel maintains signal integrity of the transmission using the pre-distributed information. For example, in one embodiment, the Gateway Channel provides the means for uniquely coded acknowledgement from the recipient to the sender and maintains signal integrity by verifying receipt by the intended recipient. In some embodiments, unique formatting of the transmission limits the transmission to the intended sender-receiver pair. For example, the multi-part message may comprise unique formatting known only to the sender-receiver pair which prevents interception or decoding of the transmission by receivers outside of the sender-receiver pair.

Figure 6:
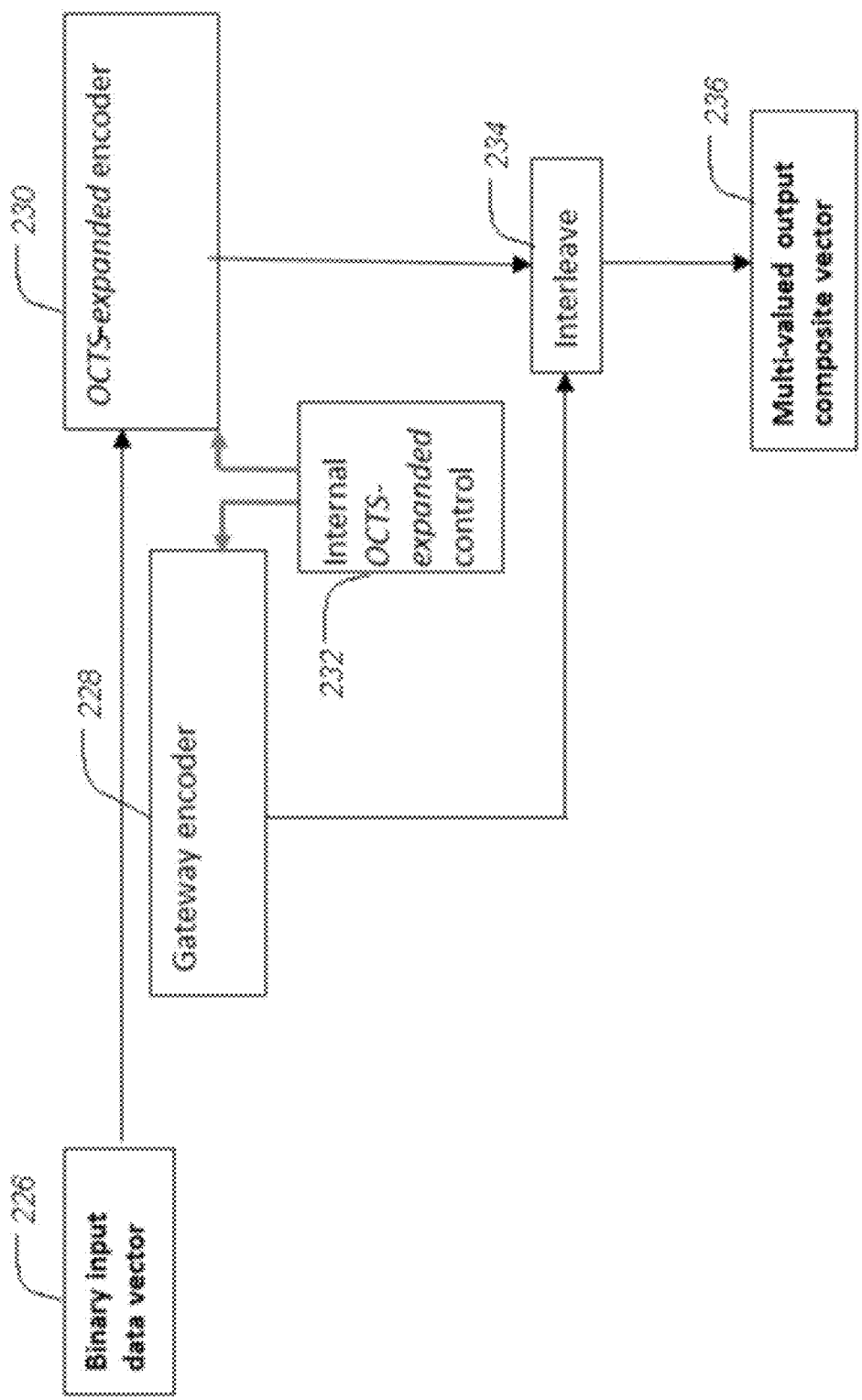
FIG. 6 illustrates one embodiment of an OCTS-expanded process including an interleaved data vector.

In some embodiments, a data vector is interleaved as illustrated in FIG. 6. A binary input data vector 226 is provided to an OCTS-expanded encoder 230. The OCTS-expanded encoder 230 applies an OCTS-expanded table to the binary input data vector 226. A gateway encoder 228 encodes a gateway channel utilizing a second OCTS-expanded table. The data stream for the OCTS-expanded encoder 230 and the gateway encoder 228 are interleaved 234 into the same output stream to produce a multi-valued output composite vector 236, which is transmitted over a communication channel. In some embodiments, the communication channel may comprise an RF communication channel. In other embodiments, the communication channel may comprise any bound or unbound communication channel. An internal OCTS-expanded controller 232 is configured to control both the OCTS-expanded encoder 230 and the gateway encoder 228.

In operation, signal integrity is established and maintained through the use of encoding provided by the use of OCTS. In some embodiments, the transmitter encodes the digital bit stream intended for transmission using a pre-distributed Gateway Channel code table to generate an OCTS-expanded message. The OCTS-expanded encoded message comprises Gateway Channel information and Composite Channel information. The Gateway Channel information may be distinguishable by, for example, location in the interleaved stream (referred to as an interleaving schedule), by use of the output vectors unique to the Gateway Channel (referred to as table partitioning), and/or other suitable distinguishing techniques. The Gateway Channel provides an encoded bit stream to carry information required to decode the Composite Channel information.

In some embodiments, pre-distributed information provides the information necessary to decode the Gateway Channel information. The decoded Gateway Channel information identifies the current OCTS-expanded code table in use by the Composite Channel and therefore allows access to the Composite Channel information. The pre-distributed information may comprise, for example, the Gateway Channel OCTS code table identifier, the interleave schedule and/or the table partitioning information for decoding the interleaved Gateway Channel and Composite Channel information, additional coding used to verify the correct receipt of the Gateway Channel information, such as, for example, a checksum or masking function, and/or any other information necessary for decoding and identifying the Gateway Channel information.

In some embodiments, the Composite Channel comprises control data used to authenticate a transmitter and/or a receiver, adjust the code table for optimizing data transfer rate, changing the code table to enhance where in the code table the data is located for maintaining signal integrity, changing the interleaving of the signal data and control data, and/or additional information. The changes made by the control data in the Composite Channel may require a full transmit/receive cycle to properly propagate within the system to affect a shift in the code table in use. By pre-distributing the interleave schedule and/or the table partitioning information, the OCTS-expanded transmission can only be decoded by a receiver in possession of the initial code table definitions and which knows the method of how subsequent code table changes are encoded within the digital bit stream. Signal integrity is maintained and protected, as the sender has an increased assurance that only the intended recipient can decode the transmission and that the receiver will be able to identify the digital bit stream within the transmission even at reduced transmission quality.

Figure 7:
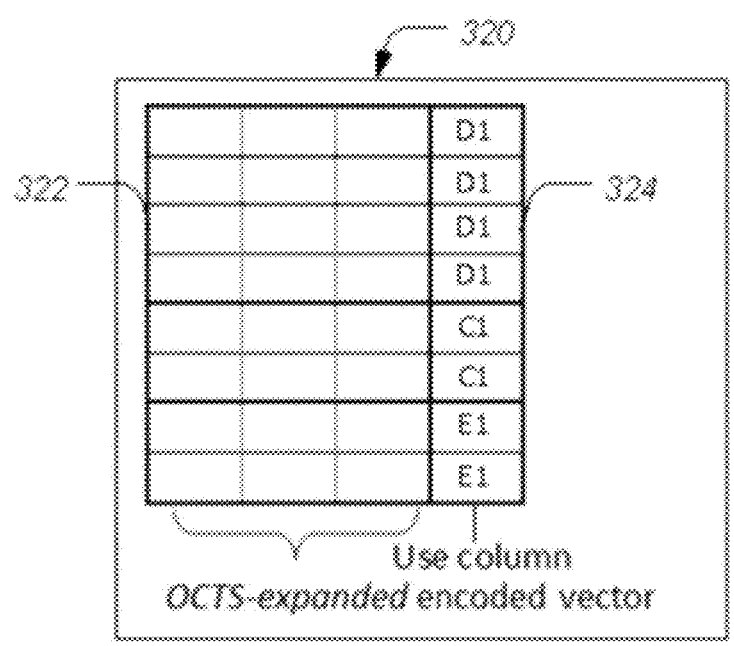
FIG. 7 illustrates one embodiment of an OCTS-expanded table comprising a designated use for each data type.

In various embodiments, a channel is defined as a specifically purposed stream of encoded information. FIG. 7 illustrates one embodiment of an OCTS-expanded table comprising a use column 322 denoting the use type for each vector within the OCTS-expanded table 320. Each data type of the Use Column of an OCTS-expanded encoded vector has a designated use. In some embodiments, control data for the Gateway Channel is used for gateway and code table identification and is denoted "C1." Control data for the Gateway Channel may be further used for Receive and Transmit (RX/TX) coordination. In some embodiments, additional use column data for the Gateway Channel comprising Error Control Coding (ECC) information, denoted as "E1", and additional data, denoted as "D1," may be included in the OCTS-expanded table 320. In some embodiments, the Composite Channel is used for combination data, RX/TX coordination and/or other possible control information. Control data for RX/TX coordination in the Composite Channel is denoted "C2", Error Control Coding information is denoted as "E2", and additional data may be included and is denoted as "D2." In some embodiments, additional uses may exist for the Composite Channel and may be used for growth and expansion of the OCTS-expanded process. In one embodiment, the additional Composite Channel data defines the function and performance of OCTS-expanded Quality of Service (QOS) processing.

In various embodiments, a pipe comprises the full set of channels for an RX/TX pair. A symbol comprises one element of an encoded output vector, a frame comprises the full element set of an encoded output vector, and a block comprises the full frame set of encoded vectors included in a message block. Symbol synchronization comprises the identification of the leading edge of single symbol. Frame synchronization comprises the identification of the initial symbol within a frame. Block synchronization comprises the identification of the initial frame within a message block.

Figure 8:
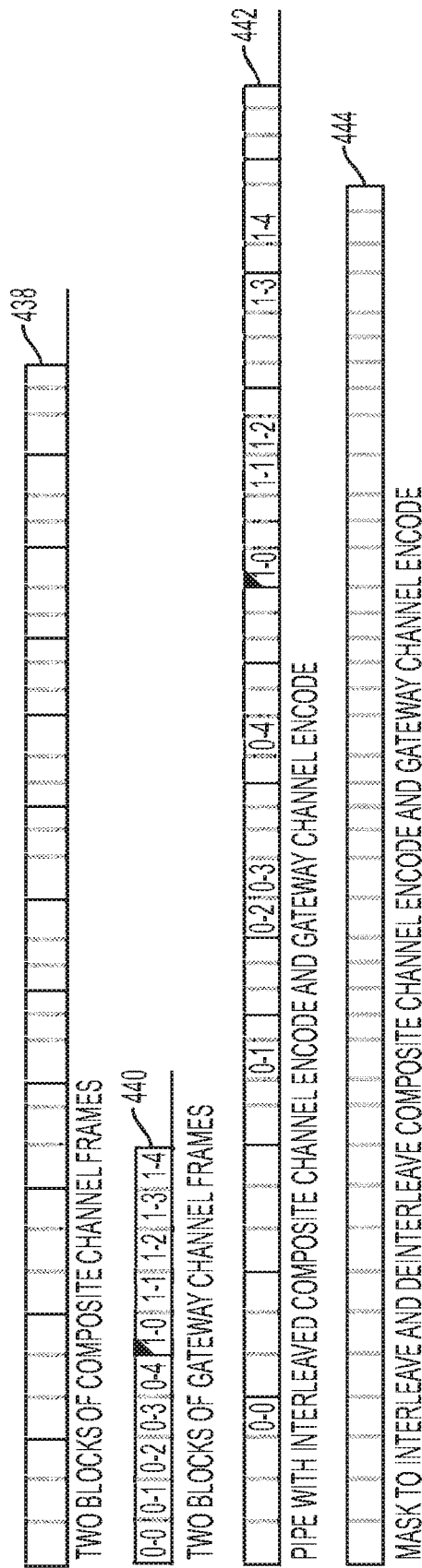
FIG. 8 illustrates one embodiment of interleaved gateway channel and composite channel vectors.

In some embodiments, the interleaved encoded multi-valued output vector is created using a mask to identify the locations within the Composite Channel symbol stream to interleave with the Gateway Channel symbol stream. FIG. 8 illustrates one embodiment of a composite channel code block 438, a gateway channel code block 440, a pipe 442 comprising the interleaved composite channel code block 438 and the gateway channel code block 440, and a mask 444 indicating the interleave pattern of the pipe 442. In the illustrated embodiment, the gateway channel block 440 length is dissimilar to the composite code block 438 length, and both are dissimilar to the Interleaved Code Block 442 length. The interleaving of the Gateway Channel 440 and the Composite Channel 438 with frame and message synchronization requires symbol synchronization. In some embodiments, the interleaving process sifts the symbols through the de-interleave function. This is detailed in Table 1, and allows full message transmission through the Composite Channel.

Figure 9:
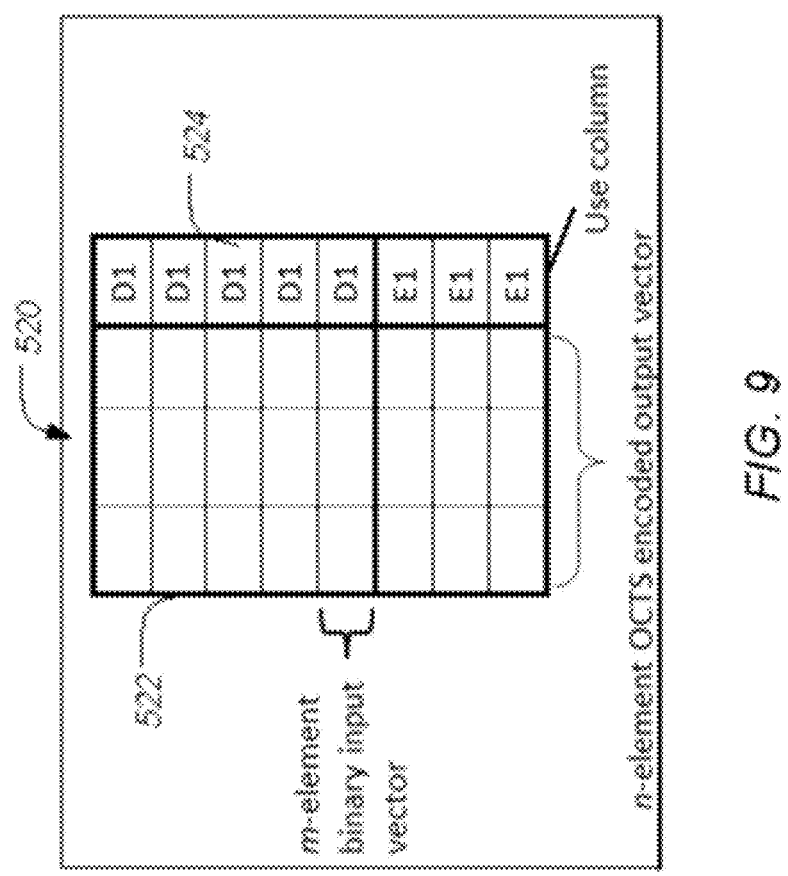
FIG. 9 illustrates one embodiment of an OCTS-expanded code table servicing an m-element binary input vector.

FIG. 9 illustrates one embodiment of an OCTS-expanded Code Table, servicing an m-element binary input vector, and generating an n-element multi-value output vector. The OCTS-expanded code table comprises a plurality of code table partitions. Code table partitions comprise the sections of the code table specifically assigned to a single channel. The code table illustrated in FIG. 9 is partitioned to encode additional data D1 and error control coding E1. In some embodiments, table partitioning provides increased minimum MFED within each partition and improves the partition noise rejection properties.

In some embodiments, a number q of symbol elements is available for each element of the output vector. For example, in the case of Multiple Frequency Key Shifting with forty one unique tones, q is equal to 41. The number of binary inputs comprises $2^m$, where m is the number of elements in the binary input vector, and the total number of possible output vectors is $q^n$, where n is the number of elements in the encoded output vector. For example, the OCTS-expanded table 520 illustrated in FIG. 7 may be used to encode a 16 bit input vector. The number of unique binary inputs is $2^{16}=65,536$, and the number of unique multi-valued output vectors is $41^3=68,921$. The OCTS-expanded Code Table associated with this input/output pairing is an array of dimension (68921, 3). In this example, the D1 partition of the OCTS-expanded Code Table comprises the first 65,536 rows, leaving 68,921−65,536=3,385 rows to encode 3,385 C1 and E1 vectors.

Figure 10:
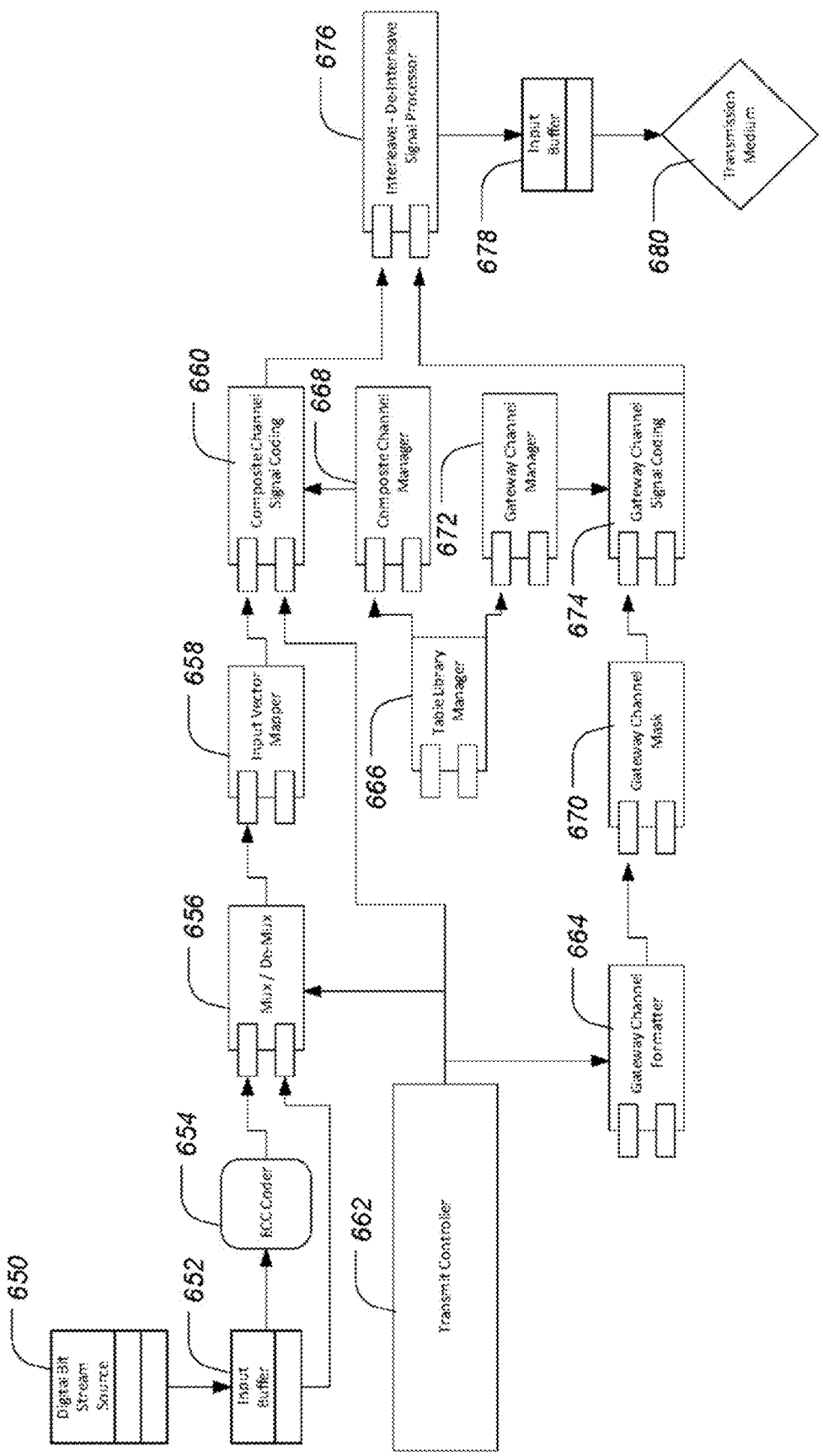
FIG. 10 illustrates one embodiment of an OCTS-expanded table transmission mode.

In various embodiments, an OCTS-expanded process can transmit and receive into an existing digital communications system to integrate robust control features into the digital data stream. FIG. 10 illustrates one embodiment of an OCTS-expanded process integrated into a digital communications system. In this embodiment, a conventional digital bit stream 650 is converted to a composite multi-valued stream, including data, control, and additional error control coding information. The digital bit stream 650 is provided to an input buffer 652. The input buffer 652 passes the digital bit stream 650 to an error control coding process 654. The digital bit stream 650 and the error control coding 654 stream are provided to a multiplexer 656 which is coupled to an input vector mapper 658. The input vector mapper 658 maps the output of the multiplexer 656 to an OCTS-expanded table. The composite channel signal coding 660 process encodes mapped vectors based on a table stored by the composite table manager 668 and the table library manager 666. The encoded data is passed to an interleaver 676 to interleave the data with a gateway channel stream. The gateway channel stream is generated by a transmit controller 662 coupled to a gateway channel formatter 664. The gateway channel formatter 664 provides gateway channel data to a gateway channel mask 670, which in turn passes the data to a gateway channel signal coding 674 process for encoding the gateway channel data. The encoded gateway channel data is provided to the interleave signal processor 676 and is interleaved with the composite channel data provided by the composite channel signal coding 660 process. The interleaved signal is provided to an input buffer 678 and then to the transmission medium 680. In some embodiments, the output of the OCTS-expanded processing transmit module of the digital communications system is one-to-one, that is, a given input to the OCTS-expanded processing transmit module always results in the same output, and the output is unique to the given input.

Figure 11:
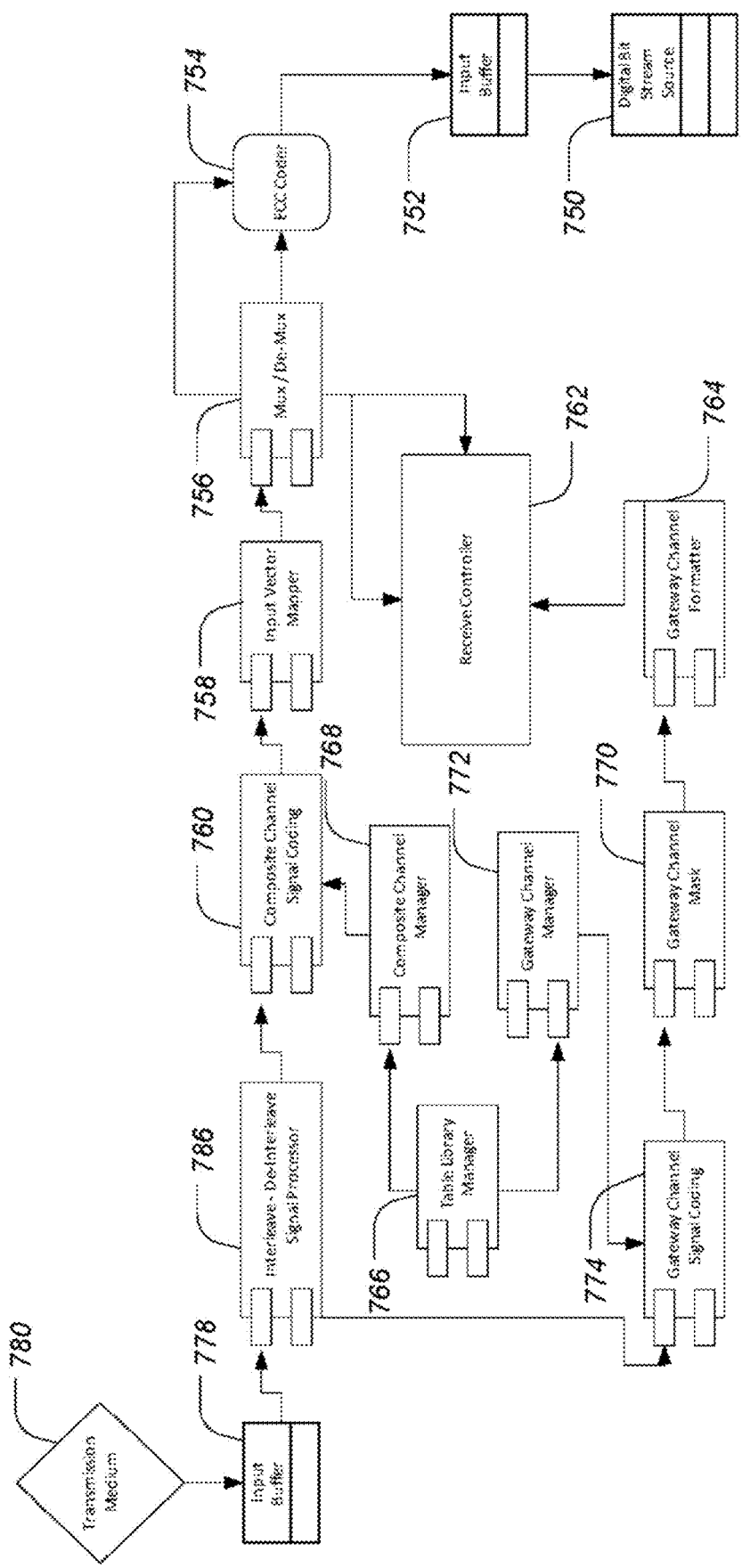
FIG. 11 illustrates one embodiment of an OCTS-expanded table receive mode.

FIG. 11 illustrates one embodiment of a receive mode of a digital communications system with an integrated OCTS-expanded process. In one embodiment, a composite multi-valued stream is converted to its constituent data, control, and error control coding channels. The decoded binary output data vectors are then passed along to be processed into a digital bit stream. The receive mode of the digital communications system is generally the reverse of the transmit mode, illustrated in FIG. 10. A multi-valued data stream is received from a transmission medium 780 and passed to an input buffer 778. The input buffer is coupled to a de-interleave signal processor 786 configured to de-interleave the received multi-valued data stream. The composite signal portion of the multi-valued data stream is provided to a composite channel signal coding 760 process for decoding. The composite channel signal coding 760 process utilizes an OCTS-expanded table to decode the received composite channel data. The decoded data is provided to an input vector mapper 758 to un-map the decoded data and provide a digital data stream. The output of the input vector mapper 758 is de-multiplexed into a data stream and an error correcting coding stream, which are both provided to an ECC coder 754. The data stream is error corrected and provided to an input buffer 752, which provides the data stream to a digital bit stream source (or destination) 750.

After being de-interleaved, the gateway channel is provided to a gateway channel signal coding 774 block to decode the gateway channel data through an OCTS-expanded table. The output of the gateway channel signal coding 774 block is provided to a gateway channel mask 770 block to remove the mask from the gateway channel data. The de-masked gateway channel data is provided to a gateway channel formatter 764, which removes previously added formatting from the gateway channel data, and provides the gateway channel data to a receive controller 762.

In some embodiments, the gateway code table and message blocks encode and decode the composite code table identifier and provide confidence in the composite code table identifier's correct decoding. In one embodiment, an appropriate number of seeds for pseudorandom number generators are used by the receive function to uniquely generate the Composite Code Table. Multiple methods may be used to establish the Gateway Code Table and Message Blocks, such as, for example, bit position partitioning, table partitioning, or a combination of the two techniques.

In Bit Position Partitioning, both the transmitter and receiver know the location of the encoded bits. Detection of the transmitted message is available to the receiver based on knowledge of the position of the encoded message. An appropriate number of seeds are used to generate the pseudorandom numbers for the unique encoding.

With table partitioning, the partitions can be allocated to increase the Mean Free Euclidian Distance (MFED) between elements of the partition by assigning encoded elements with the smallest MFED to different partitions. This increases the MFED within a partition, thus increasing noise rejection properties in the case where a received signal can be identified as a member of a specific partition.

Figure 12:
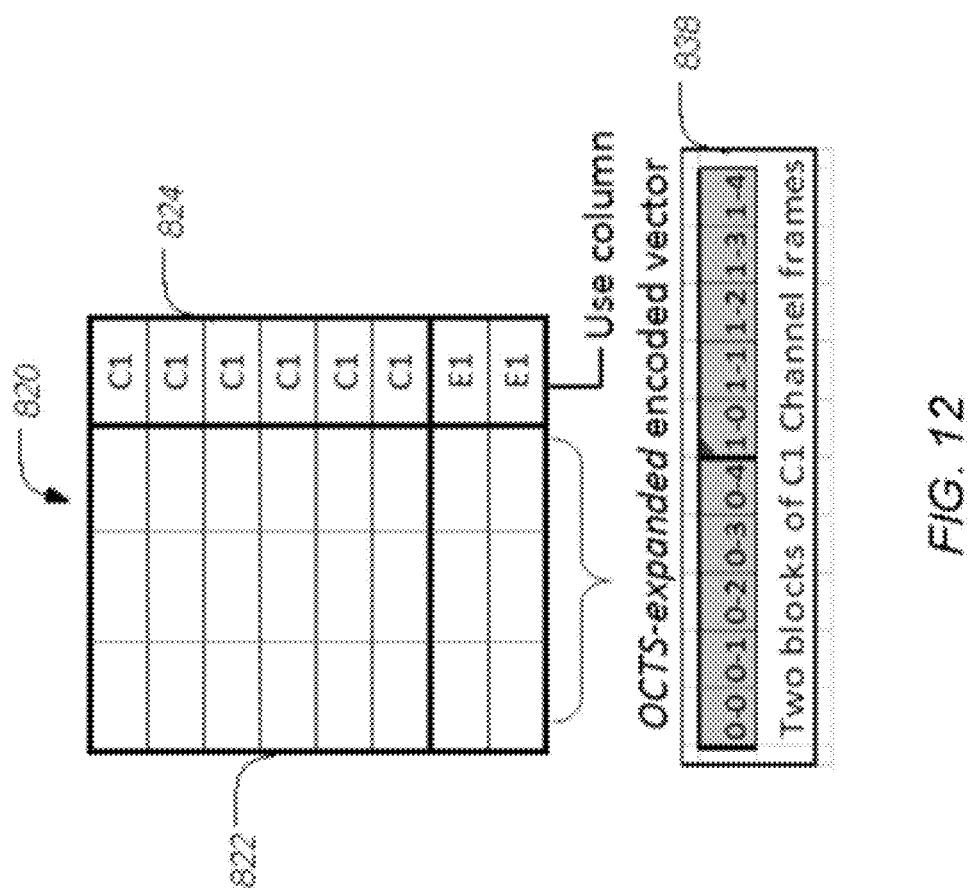
FIG. 12 illustrates one embodiment of an OCTS-expanded gateway code table and block.

With the use of table partitioning alone, the gateway channel information can be encoded using the gateway channel's partition elements without the use of bit position partitioning for identification. With bit position partitioning, the process of synchronizing against the first element of a message block can be achieved by recognizing the position of the gateway channel information within the block, and stepping back in bit position with this known offset. In table partitioning, the gateway channel information must carry this offset within its encoding, since the offset from the received Gateway Channel bits and the lead bit of a message block can vary. FIG. 12 illustrates one embodiment of a gateway code table and block configured for table partitioning. As illustrated in FIG. 12, the OCTS-expanded encoded vector for the gateway channel comprises the offset within the channel frames 838.

Figure 13:
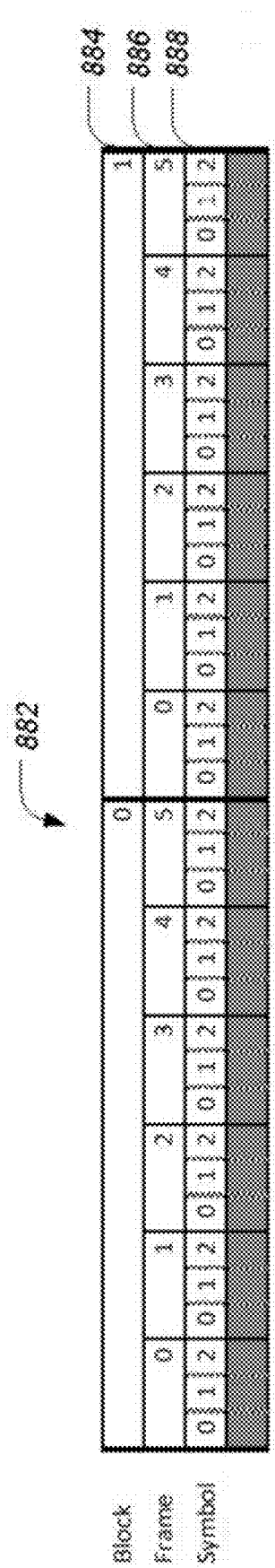
FIG. 13 illustrates one embodiment of the symbol, frame, and block relationship within a two-message block set.

FIG. 13 illustrates one embodiment of a symbol 888, frame 886, and block 884 relationship within a two-message block set 882. In the illustrated embodiment, both frames 886 and blocks 884 begin on a symbol 888 boundary. In order to perform block message processing, the specific symbol that begins a block must be identified by the OCTS-expanded process.

TABLE 1

Step-by-Step Process for message transmit and receive
Step-by-Step Process

| | |
|---|---|
| Preparation | Distribute the necessary shared information to the subscriber |
| | Gateway Table Code identifier |
| | RF Specifics: Frequency, BW, modulation, digital encoding method |
| | Interleaving mask and block length |
| Signal Acquisition Symbol synchronization | This is a receiver and demodulator function. The decoding process begins with the identification of symbols |
| De-interleaving | Search Interleaved message blocks by performing the masking function against each possible initial symbol |
| | Evaluate each candidate message block using the Gateway Code Table and the Gateway Block definition associated with FIG. 7 above. |
| | De-interleaving is successful when the seed checksums are per the predefined encode. |
| | Use the contents of the Gateway Channel Frame to determine the symbol offset to align the Composite Channel |
| Composite Channel decoding | Align the Composite Channel message block and begin decoding |
| | Continue to decode the Interleaved channel and maintaining the Composite Code Table |

In various embodiments, the interleave and de-interleave functions are configured to act in coordination with each other. The interleave and de-interleave functions are each driven by a controller utilizing the interleave and de-interleave specification and sequencing seeds.

In some embodiments, the gateway channel format and reformat functions are configured to act in coordination with each other. The gateway channel format and reformat functions are each driven by the controller utilizing the gateway channel format and reformat specification and sequencing seeds.

In some embodiments an error correcting code such a Bose, Chaudhuri, and/or Hocquenghem (BCH) code that generates additional bits that are added uniquely to the data stream is included in the OCTS-expanded processing. By adding the use definition to each code, the E1 encoded vectors can be injected into the composite data stream in an arbitrary location, since they can be identified specifically as the generated parity and error correction bits. In various embodiments, the input MUX and output DEMUX are configured to act in coordination with each other. The input MUX and the output DEMUX are each driven by the controller utilizing the MUX/DEMUX specification and sequencing seeds.

In some embodiments, an OCTS-expanded communication system comprises a controller. The controller is responsible for a series of tasks, such as, for example QOS monitoring and code table selection to meet the needs of a dynamic transmission environment. The controller may be further responsible for specifying, scheduling, and coordinating code table swaps, input remapping, multiplexer and de-multiplexer operations, gateway channel formatting, and/or interleaved operations. In some embodiments, the controller is configured to receive information, such as, for example, code table swap seeds, input remapping seeds, multiplexer and de-multiplexer operation seeds, gate channel formatting seeds, and/or interleaved operation seeds. The received seeds may be generated from the code table generator seeds coded in the gateway channel.

In some embodiments, operational requirements for the controller comprise monitoring the transmission environment and adapting to the transmission environment and maintaining a sufficiently high rate of table swapping to maintain signal integrity. The operational requirements may be driven by a specific application. The controller management may be driven by a requirements matrix, an options matrix defined by the system resources, and/or direct and indirect performance and transmission environment measures. Direct performance and transmission environment measures may comprise, for example, direct QOS measurements derived using code built into the code table to calibrate against a known signal and receiver-unique measurements. Indirect performance and transmission environment measures may comprise, for example, bit error rate derived from error control coding schemes, SNR estimate derived from miss distance measures used in the decoding process, and/or rule in/rule out measure.

In some embodiments, an indirect performance and transmission environment measure comprises rule in/rule out measure. An OCTS decode process requires comparing the received decoded vector against all of the encoded vectors in a code table. In some embodiments, rather than an exhaustive search of the table, a rule in rule may be implemented. A rule in rule requires that if the MFED between the input vector and a code table vector is less than a predetermined value, the decoded vector is immediately ruled in as the matching vector and the search can cease. In some embodiments, a rule out rule may be implemented. A rule out rule requires that if the accumulated MFED calculated on a vector element-by-vector element basis exceeds a predetermined threshold, the code table vector can be ruled out and the MFED calculation for that vector can cease. In some embodiments, a derived measure is generated in the case where no vector is ruled in, and all but a few vectors are ruled out. In this embodiment, the vectors that are not ruled out are correlated to a signal to noise ratio and the proper match determined.

Figure 14:
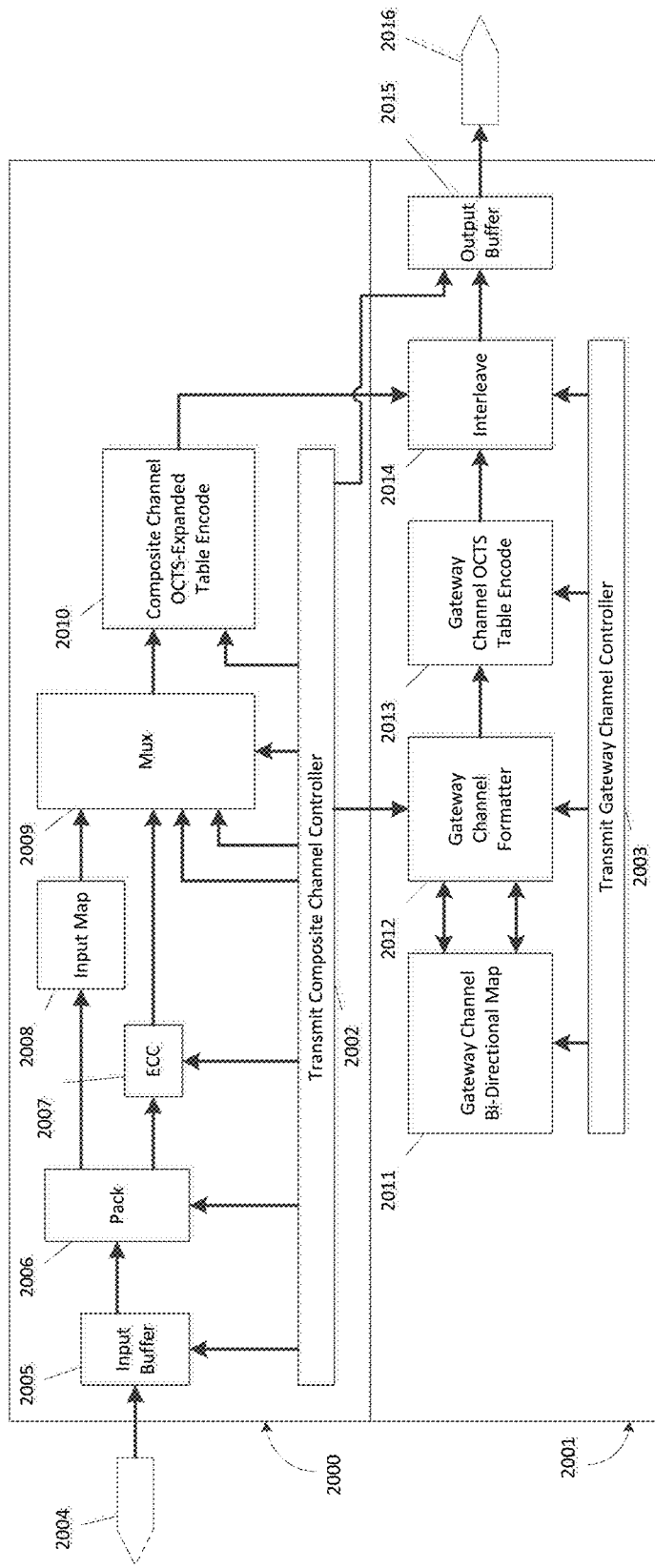
FIG. 14 illustrates another embodiment of an OCTS-expanded process for transmitting a digital bit stream and transmitting it as a multi-valued stream.

FIG. 14 illustrates another embodiment of an OCTS-expanded process for transmitting a digital bit stream using a Gateway Channel 2000 and a Composite Channel 2001. In this embodiment, a binary input data vector 2004 is converted into a composite multi-valued output vector 2016, including data, control, and additional error control coding information. This process uses a Composite Channel transmit side 2000, which is managed by a transmit Composite Channel controller 2002, and a Gateway Channel transmit side 2001, which is managed by a transmit gateway channel controller 2003. The binary input data vector 2004 is provided to the Composite Channel transmit side 2000, in which it enters an input buffer 2005, which manages the input stream. The input buffer 2005 passes the binary input stream to a pack process 2006, which packs the incoming input stream. The packed input stream is transferred from the pack process 2006 to the error control coding process 2007 and input mapping process 2008. The resulting error control encoded input stream from the error control coding process 2007, the data bit mapped data input stream from the input mapping process 2007, and additional information from the transmit composite channel controller 2002 are provided to a mux 2009, which outputs a combined composite information stream. This combined composite information stream is passed to the composite channel OCTS-expanded table encode process 2010, which outputs an OCTS encoded composite stream.

While the binary input data vector 2004 is being processed by the Composite Channel transmit side 2000, the transmit composite channel controller 2002 also passes the input stream to the gateway channel formatter 2012 in the Gateway Channel transmit side 2001. The gateway channel formatter 2012 communicates with the gateway channel bi-directional map 2011 to encode intermediate variables and format the input stream. The formatted gateway information from the gateway channel formatter 2012 is transferred to the gateway channel OCTS table encode process 2013 where it undergoes OCTS encoding. The OCTS-encoded gateway information from the gateway channel OCTS table encode process 2013 is interleaved 2014 with the OCTS-encoded composite information stream from the composite channel OCTS-expanded table encode process 2010. The resulting interleaved input stream from the interleave process 2014 is passed to an output buffer 2015, which issues a multi-valued output vector 2016.

Figure 15:
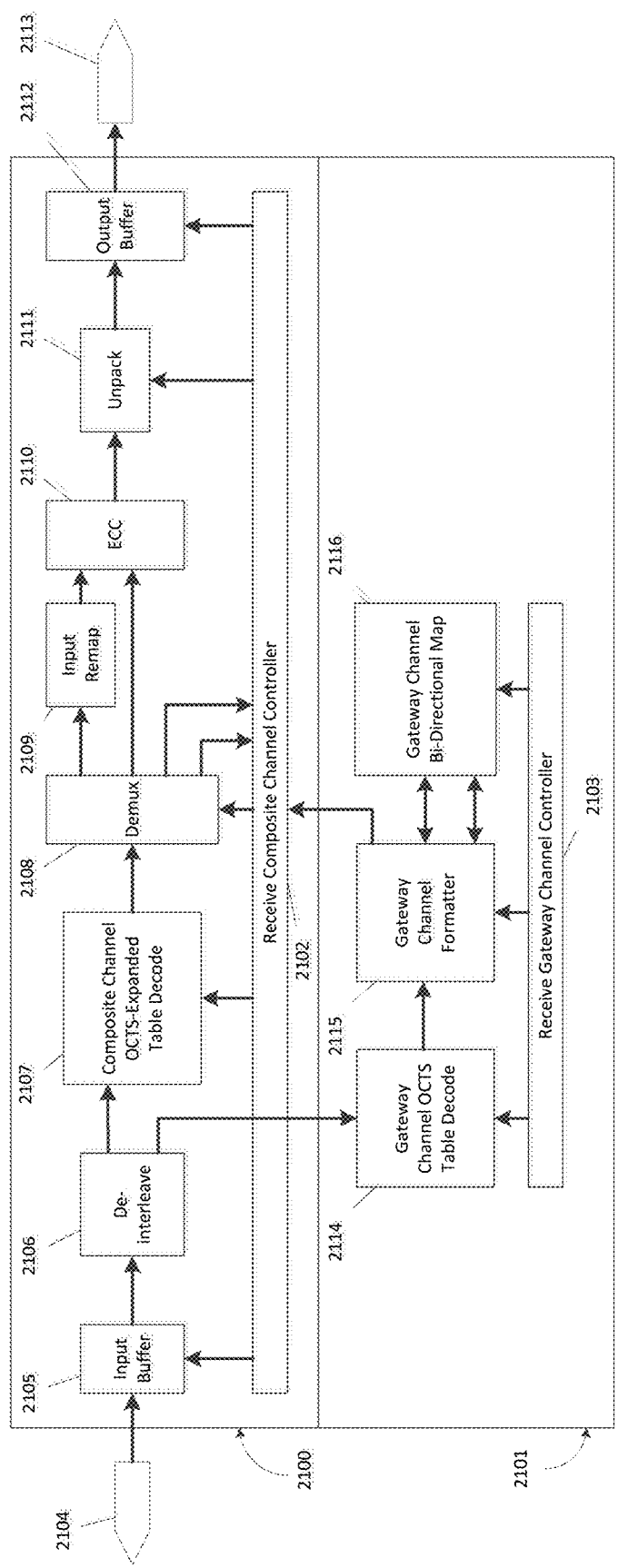
FIG. 15 illustrates another embodiment of an OCTS-expanded process for receiving a multi-valued stream and converting it into its constituent parts.

FIG. 15 illustrates another embodiment of an OCTS-expanded process for receiving a composite multi-valued stream and converting it into its constituent data, control, and error control coding channels, using a Composite Channel and a Gateway Channel. In this embodiment a received composite multi-valued stream 2104 is decoded into a binary output data vector. This process uses a Composite Channel receive side 2100, which is managed by a receive Composite Channel controller 2102, and a Gateway Channel receive side 2102, which is managed by a receive gateway channel controller 2103. A multi-valued input vector 2104 is presented to the Composite Channel receive side 2100, where it enters an input buffer 2105. The incoming input stream is passed from the input buffer 2105 to a de-interleaving process 2106, where it is separated into a composite vector that is transferred to a composite channel OCTS-expanded table decode process 2107, and a gateway vector that is transferred to the gateway channel OCTS table decode process 2114. The composite channel OCTS-expanded table decode process 2107 decodes the composite stream and passes it to a demux 2108. The demux 2108 separates the composite stream into a data stream and an error control code stream. The demux 2108 transfers the data stream to an input remap process 2109 and passes the error control code stream to an error control coding process 2110. The remapped data stream from the remap process 2109 is also passed to the error control coding process 2110. The result of the error control coding process 2110 is transferred to an unpack process 2110. The result of the unpack process 2110 is passed to an output buffer 2112, which produces the binary output vector 2113.

While the input stream is being processed by the Composite Channel receive side 2100, it is also being processed by the Gateway Channel receive side 2101. The gateway channel OCTS table decode process 2114 receives the deinterleaved 2106 input stream and produces OCTS-decoded gateway information. The OCTS-decoded gateway information is transferred to a gateway channel reformat process 2115, which reformats the gateway information. The gateway channel reformat process 2115 communicates with a gateway channel bi-directional map 2116 to decode intermediate variables, and returns its result to the receive composite channel controller 2102.

Figure 16:
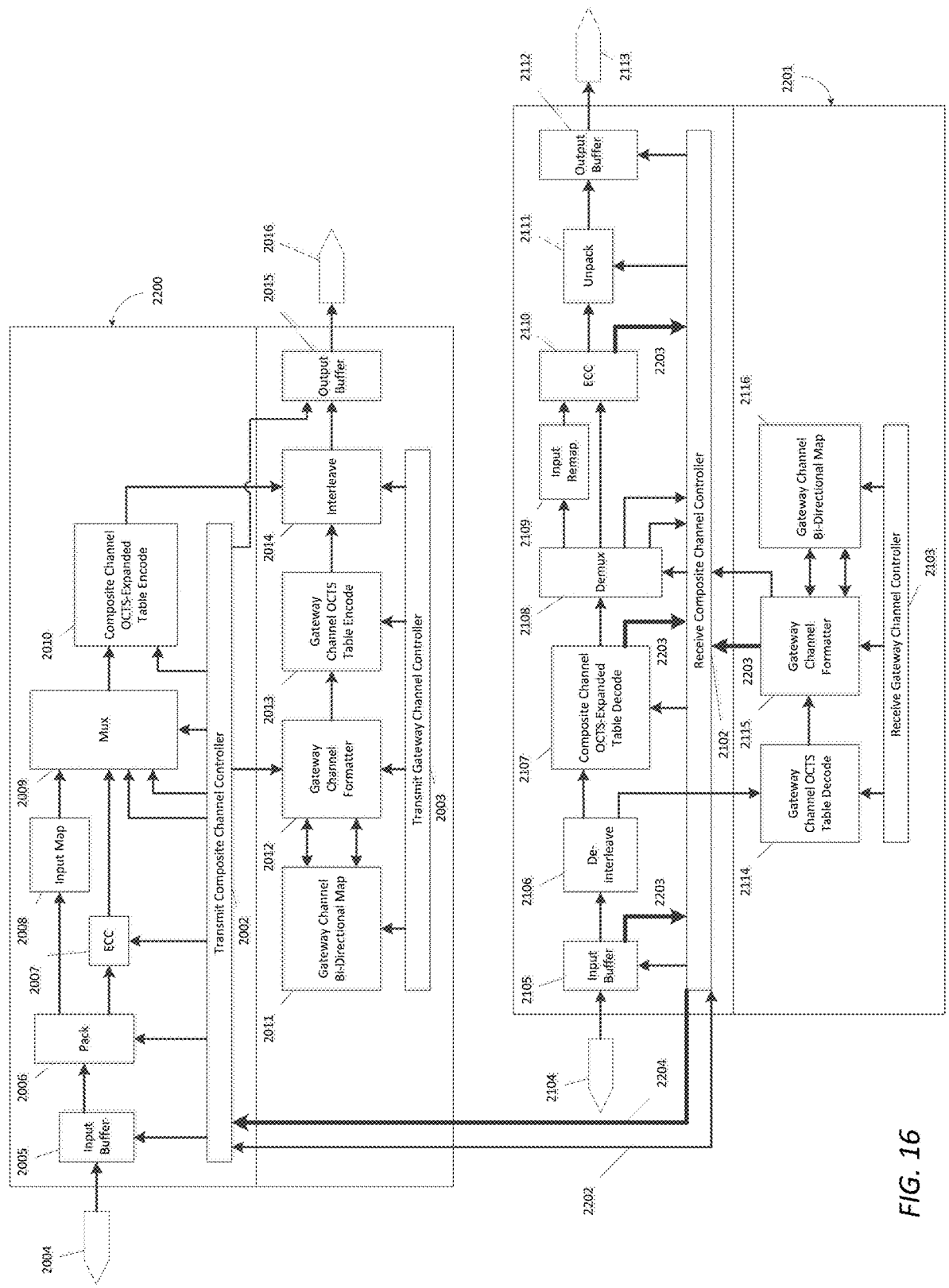
FIG. 16 illustrates one embodiment of a host/client server utilizing an OCTS-expanded transmit process and OCTS-expanded receive process.

FIG. 16 illustrates one embodiment of a host server utilizing an OCTS-expanded transmit process 2200 and OCTS-expanded receive process 2201 to transmit binary input data vectors as multi-valued output vectors, and receive multi-valued input vectors for decoding into binary data input vectors. FIG. 16 also illustrates the interaction between the transmit process 2200 and the receive process 2201. It will be appreciated by those skilled in the art that a client server utilizing OCTS-expanded transmit 2200 and receive 2201 processes would be implemented the same way, with the client server receiver side 2201 communicating with the host server transmit side 2200, and the host server receive side 2201 communicating with the client server transmit side 2200.

In the embodiment illustrated by FIG. 16 the transmit composite channel controller 2002 of a host server serves as the master controller, and provides dynamic control of both the host server system and client server system, either to adapt to a changing transmission environment or to change to system tables and maps that provide additional network and signal integrity. The control information from the transmit composite channel controller 2002 of the host server flows to the host server receive composite channel controller 2102 along control flow 2202, and also to the host server transmit mux 2009 for transmission to the client server. The control information received by a client server continues to the client server's demux 2108, from which it is transferred to the receive composite channel controller 2102 of the client server. The client server's receive composite channel controller 2102 transfers the control information along control flow 2202 to the client server's transmit composite controller 2002.

In some embodiments, the Gateway Channel OCTS-Expanded Table used by the gateway channel OCTS table encode process 2013 and decode process 2114 may use a set of associated tables, each generated using a continuation of a pseudo-random sequence generated by the seed or seeds used to create the Gateway Channel OCTS-Expanded Table. The associate tables may include: a formatter sequence and schedule, a channel mask sequence and schedule, and/or an interleave sequence and schedule.

Similarly, in some embodiments the Composite Channel OCTS-Expanded Table used by the composite channel OCTS table encode process 2010 and decode process 2107 may use a set of associated tables, also generated by a continuation of a pseudo-random sequence generated by the seed or seeds used to create the Composite Channel OCTS-Expanded Table. The associated tables may include: an error control coding (ECC) sequence and schedule, an input mapping sequence and schedule, and an OCTS-expanded table sequence and schedule.

In some embodiments, the system design process is driven by requirements outlined in Table 2. The design outlined in Table 2 comprises identifying the operating range, prioritizing requirements, and designing a set of sequenced Code Tables that meet the requirements.

TABLE 2

| System Design Driver |
| --- |
| Information Source/Drain |
|     Amount of Data |
|     Timeliness of Data |
|     Sensitivity of Data |
|     Computation Power |
|     Manageable signal complexity |
| Transmission Medium |
|     Public or Private System |
|     Uni or Bi Directional |
|     Fixed or Variable Transmission Environment |
|     Level of Transmitter/Receiver Control |
|         Modulator Control |
|         Transmitter Power Control |
|         Receiver Sensitivity Control |
|         Frequency, Channel, Mode Control |
|         Bandwidth |

TABLE 2-continued

| System Design Driver |
| --- |
| Signal Integrity |
|     Level of Exposure |
|     Time Value of Information |
|     Desirability of Information-Transaction |
|     Financial |
|     National/Property/Personal Security |
|     Operations criticality |
|     Operations denial or misdirection |
|     Reliability requirements |

Dynamic Control of Quality of Service (QOS)

Further embodiments provide for the changing of elements of OCTS either by choice of code table, bit positioning, table partitioning, interleaving, or a combination thereof to maintain a desired level of QOS based on derived quantitative measures of QOS. Derived measures of QOS may include, but are not limited to, service response time, loss, signal-to-noise ratio, crosstalk, echo, interrupts, frequency response, loudness levels, a required bit rate, delay, jitter, packet dropping probability and/or bit error rate, data rate and delay, dynamically control scheduling priorities, validation of embedded controls, message echo, and any other measures of QOS that may be derived by one skilled in the art.

In some embodiments, OCTS is configured based on initial conditions, where the table is selected based on the minimum MFED across all output vector pairs where the largest MFED is desired. OCTS-enhanced is designed to allow the sender and receiver to manage communication based on a desired level of QOS. Sender-Receiver combinations specify the desired level of QOS and use derived measures of QOS to modify the initial and subsequent table to maintain the desired level of QOS.

OCTS is applicable across the range of bound and unbound communication methods and the methods of specifying QOS and deriving measure of QOS for those media. It is applicable to the range of signal transmission techniques including but not limited to Frequency Shift Key (FSK), Phase Shift Key (PSK), Pulse Width Modulation (PWM), Pulse Amplitude Modulation (PAM), Frequency Modulation (FM), Amplitude Modulation (AM), Orthogonal Frequency-Division Multiplexing (OFDM), Quadrature Amplitude Modulation (QAM), and combinations of these and other techniques.

OCTS is also applicable to a wide variety of network types and protocols including telephony, continuous data transmission, and packet switched networks which each may possess specific QOS metrics for performance and may have unique quantitative measures of QOS. This is specifically true within explicit protocols for network type such as frame relay, asynchronous transfer mode (ATM) and multiprotocol label switching (MPLS) for packet switched networks. Mobile networks present unique challenges and often have unique QOS requirements. Unique QOS requirements also exist for circuit switched networks as well as for streaming multimedia, especially full fidelity video data.

Telephony—Service Response Time. Service response time is critical in telephony as a real time process. Management of service response time by changing table size, changing bit position partitioning, table partitioning, or a combination thereof, to modify the blended partitioning for the m-element vector table is key to establishing the minimum service response time. Dynamic changes in these elements can assure that a minimum service response time is met.

Telephony—Signal-to Noise Ratio. Signal-to-Noise Ratio (SNR) is a key measure in QOS as it defines the baseline of where a signal can be distinguished from the combination of baseline noise and interference. OCTS fundamentally manages SNR by shifting the modulation of the signal within the frequency band of operation to avoid noise. OCTS-enhanced can dynamically shift operation through changing table size, changing bit position partitioning, table partitioning, or a combination thereof, to modify the blended partitioning for the m-element vector table to operate outside of a changing noise band for the transmission.

Telephony—Frequency Response. Many telephony applications depend on frequency characteristics for the transmission of signals. These include modulation techniques such as Frequency Shift Keying (FSK), Phase Shift Keying, and Pulse Width Modulation (PWM) techniques. Frequency response can be quantitatively measured and used to change table size, bit position partitioning, table partitioning, or a combination thereof, to modify the blended partitioning for the m-element vector table in order to optimize Frequency Response.

Packet switched networks—low throughput. Calculation of throughput including encode and decode time may require shifting to a table that improves encode/decode performance by reducing table size, changing bit position partitioning, table partitioning, or a combination thereof, to modify the blended partitioning for the m-element vector table to enhance throughput.

Packet switched networks—Dropped Packets. Failed delivery of packets may require shifting to a table that reduces data rate or increases buffering to allow for proper packet delivery by reducing table size, changing bit position partitioning, table partitioning, or a combination thereof, to modify the blended partitioning for the m-element vector table to prevent dropping packets.

Packet switched networks—Bit Error. Errors in the data detected by the receiver may require shifting to a table that adds redundancy to the transmitted data by reducing table size, changing bit position partitioning, table partitioning, or a combination thereof, to modify the blended partitioning for the m-element vector table to eliminate bit errors in the received data.

Packet switched networks—Latency. Latency that impacts an application such as VoIP may require shifting to a table that reduces overhead lessening the impact of OCTS on latency by reducing table size, changing bit position partitioning, table partitioning, or a combination thereof, to modify the blended partitioning for the m-element vector table to prevent dropping packets.

Packet switched networks—Jitter and Out-of-Order Delivery. OCTS is highly sensitive to order of packets as transmitted and received to assure that packets remain ordered especially due to the impact of the Gateway Channel and Composite Channel. A protocol for managing out of order packets may be contained within the encoding and may result in changes in table size, bit position partitioning, table partitioning, or a combination thereof, to modify the blended partitioning for the m-element vector table to manage jitter and out-of-order delivery.

In one embodiment, the gathering of QOS information involves a host server and a client server. Referring again to FIG. 16, the client server's receive composite channel controller 2102 aggregates QOS information 2203 from various points in the client server's Composite Channel and Gateway Channel in the client's receive side 2201. The client server's receive composite channel controller 2102 passes the aggregated QOS information 2203 to the client server's transmit composite channel controller 2002 along flow path 2204, for transmission by the client server's transmit side 2200 to a host server.

Figure 17:
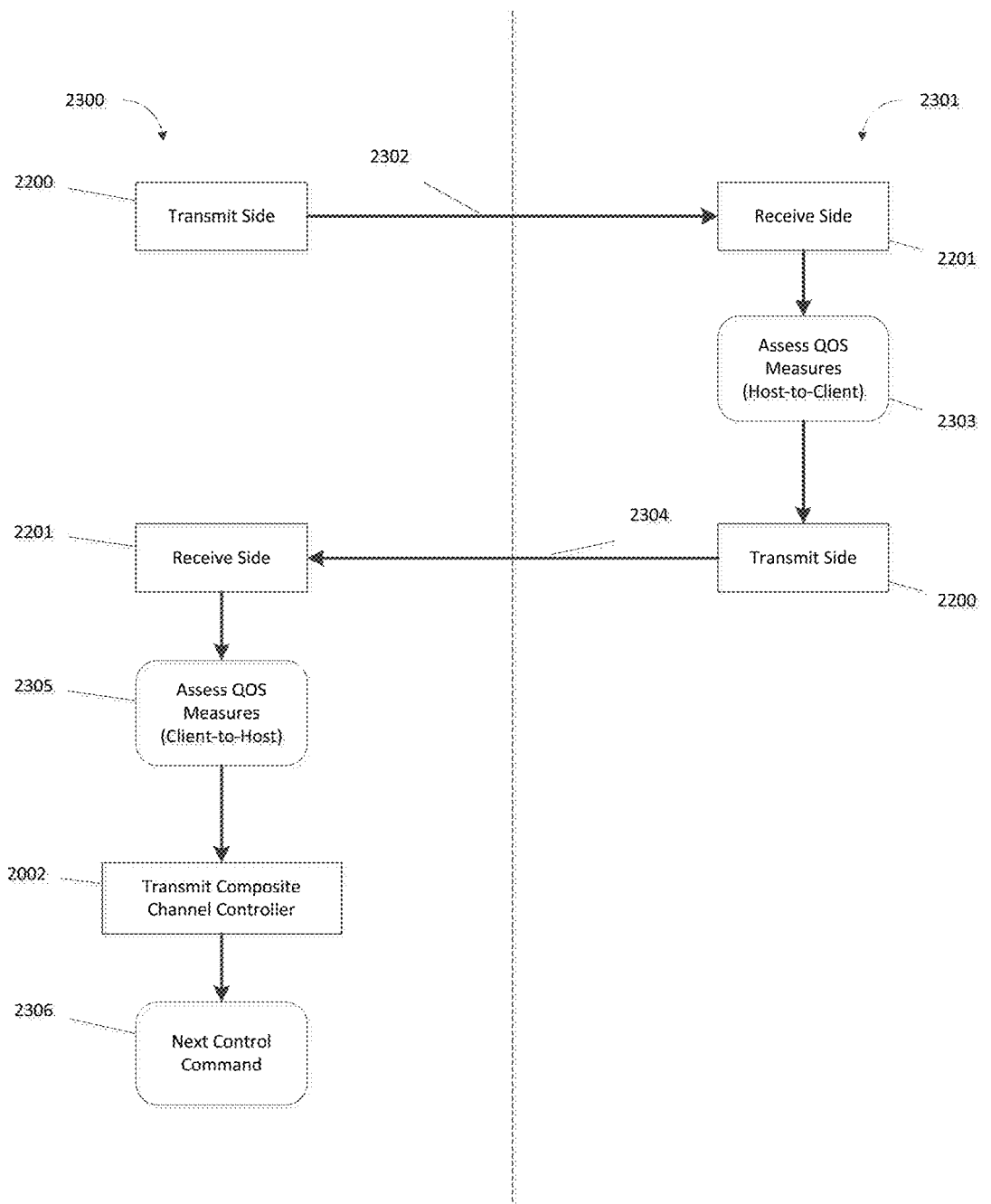
FIG. 17 illustrates one embodiment of a process for assessing and transferring QOS information between a host server and a client server.

FIG. 17 illustrates one embodiment of a process for assessing and transferring QOS information between a host server 2300 and a client server 2301. In the process of transferring data between the host server 2300 and the client server 2301, the host server 2300 may transmit a full set of data 2302 from its transmit side 2200. The client server 2301 receives the full data set 2302 in its receive side 2201. The client server 2301 will assess the QOS measures received from the host server 2300 at step 2303. The client server 2301 will pass the QOS measures and additional client server 2301 QOS information to the client server's 2301 transmit side 2200. The client server's 2301 transmit side 2200 transmits the QOS information 2304 back to the host server 2300. The QOS information 2304 is received by the host server's 2300 receive side 2201. The host server 2300 will assess the QOS information 2304 from the client 2301 to the host 2300. The host server 2300 will pass both the host-to-client QOS information and the client-to-host QOS information to the host server's 2300 transmit composite channel controller 2002. The host server's 2300 transmit composite channel controller 2002 will use the QOS information to generate the next control command at step 2306.

Authentication of a Subscribed Code Table User

Further embodiments provide authentication of a user to a network, or to another specific user, to provide a higher level of assurance and of privacy to a communication between the sender and the receiver. Authentication may be provided within the elements of OCTS and may be implemented by receipt and decoding of the embedded Gateway Channel encoded bit stream. This decoding requires pre-distributed information identifying the Gateway Channel initialization parameters, to include the specific OCTS table, the Gateway Channel message formatting algorithm, the Gateway Channel bi-directional map, and interleave map for interleaving the Gateway Channel bit stream with the Composite Channel. The Gateway Channel message-formatting algorithm is designed with a verification function (e.g. checksum, CRC, etc.) such that the valid decoding of the encoded bit stream is authenticated only when the verification function derived value is valid. This provides one-way authentication at the receiver that the transmitter is valid. Utilization of these techniques may include, but is not limited to, techniques as described above and may be extended to those that may be derived by one skilled in the art.

In some embodiments, OCTS is configured based on initial conditions where the table is selected based on the minimum MFED across all output vector pairs where the largest MFED is desired. Within the initial conditions used to establish the desired table for use, the initial authentication information may be encoded into the Gateway Channel. OCTS-enhanced is designed to allow the sender and receiver to manage communication based on a desired level of privacy and the ability to adapt the authentication information supports this feature. Sender-Receiver combinations specify the desired level of privacy for the current and future communications and use encoded data within the Gateway and Composite Channels to modify the initial authentication information and provide updates to the sender and receiver respectively.

Authentication may be further validated by the response from the receiver as returned to the sender. Since the message path from the sender to the receiver need not be identical to the message path from the receiver to the sender, this can employ an additional set of pre-distributed information defining the receiver to the sender path. This can be used to authenticate to the sender that the receiver is a validated member of the network. The Gateway Channel message-formatting algorithm is used to encode the description of the current state of the Composite Channel encoding including the Composite Channel OCTS table. The partition of the Composite Channel OCTS table uniquely encodes data, QOS measures, system control logic, and Error Control Coding. The system control data is a limited set of symbols constrained by operational sequencing. Receipt of a control vector that does not make operational sense may be identified. The identification of a control data vector that is outside of operational constraints may provide an additional measure of authentication.

Authentication mechanisms described herein are applicable to the range of signal transmission techniques including but not limited to Frequency Shift Key (FSK), Phase Shift Key (PSK), Pulse Width Modulation (PWM), Pulse Amplitude Modulation (PAM), Frequency Modulation (FM), Amplitude Modulation (AM), Orthogonal Frequency-Division Multiplexing (OFDM), Quadrature Amplitude Modulation (QAM), and combinations of these and other techniques.

Authentication mechanisms are also applicable to a wide variety of network types and protocols including telephony, continuous data transmission, and packet switched networks which each may possess specific authentication techniques. This is specifically true within explicit protocols for network type such as frame relay, asynchronous transfer mode (ATM) and multiprotocol label switching (MPLS) for packet switched networks. Mobile networks present unique challenges and often have unique authentication requirements.

Computing Device

Figure 18:
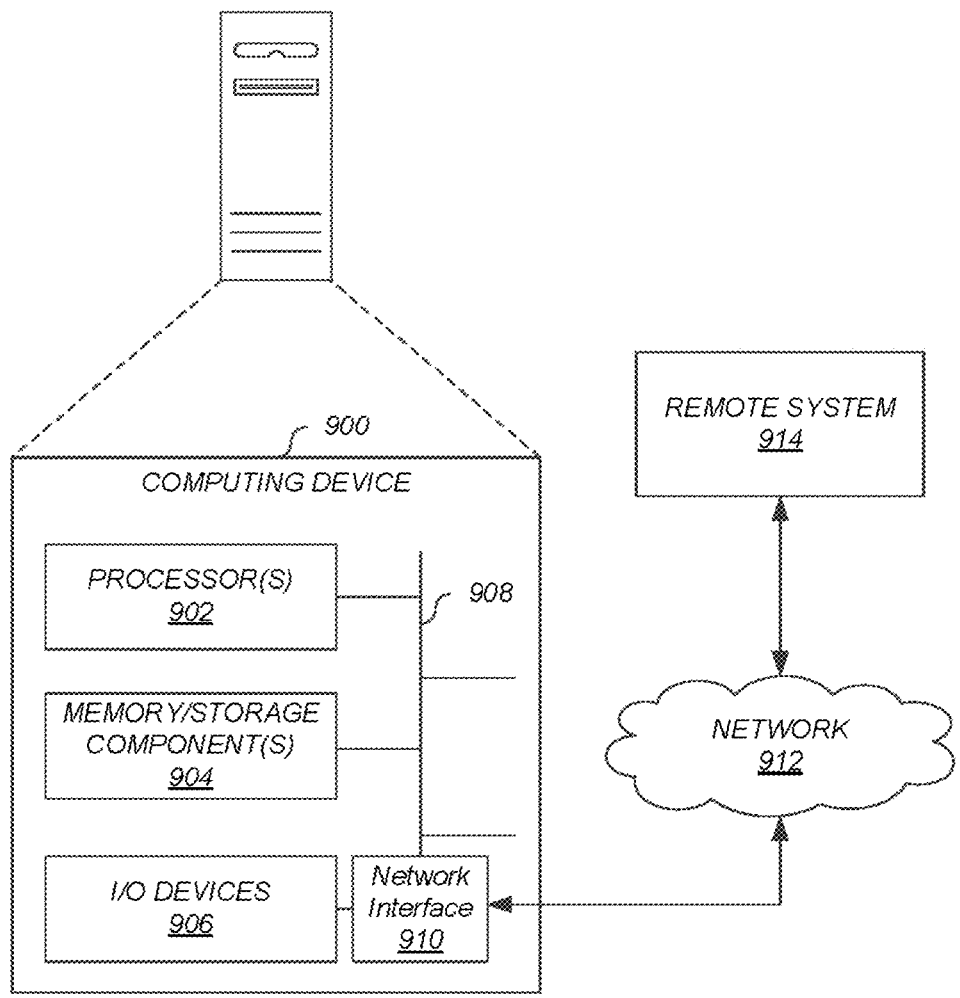
FIG. 18 illustrates one embodiment of a computing device which can be used in one embodiment of the systems and methods for network monitoring and analytics.

FIG. 18 illustrates one embodiment of a computing device 900 which can be used in one embodiment of the systems and methods for OCTS-expanded communication. For the sake of clarity, the computing device 900 is shown and described here in the context of a single computing device. It is to be appreciated and understood, however, that any number of suitably configured computing devices can be used to implement any of the described embodiments. For example, in at least some implementations, multiple communicatively linked computing devices are used. One or more of these devices can be communicatively linked in any suitable way such as via one or more networks (LANs), one or more wide area networks (WANs), wireless connections, or any combination thereof.

In this example, the computing device 900 comprises one or more processor circuits or processing units 902, one or more memory circuits and/or storage circuit component(s) 904 and one or more input/output (I/O) circuit devices 906. Additionally, the computing device 900 comprises a bus 908 that allows the various circuit components and devices to communicate with one another. The bus 908 represents one or more of any of several types of bus structures, including a memory bus or local bus using any of a variety of bus architectures. The bus 908 may comprise wired and/or wireless buses.

The processing unit 902 may be responsible for executing various software programs such as system programs, application programs, and/or modules to provide computing and processing operations for the computing device 900. The processing unit 902 may be responsible for performing various voice and data communications operations for the computing device 900 such as transmitting and receiving voice and data information over one or more wired or wireless communication channels. Although the processing unit 902 of the computing device 900 includes single processor architecture as shown, it may be appreciated that the computing device 900 may use any suitable processor architecture and/or any suitable number of processors in accordance with the described embodiments. In one embodiment, the processing unit 900 may be implemented using a single integrated processor.

The processing unit 902 may be implemented as a host central processing unit (CPU) using any suitable processor circuit or logic device (circuit), such as a as a general purpose processor. The processing unit 902 also may be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the processing unit 902 may be coupled to the memory and/or storage component(s) 904 through the bus 908. The memory bus 908 may comprise any suitable interface and/or bus architecture for allowing the processing unit 902 to access the memory and/or storage component(s) 904. Although the memory and/or storage component(s) 904 may be shown as being separate from the processing unit 902 for purposes of illustration, it is worthy to note that in various embodiments some portion or the entire memory and/or storage component(s) 904 may be included on the same integrated circuit as the processing unit 902. Alternatively, some portion or the entire memory and/or storage component(s) 904 may be implemented in an integrated circuit or other medium (e.g., hard disk drive) external to the integrated circuit of the processing unit 902. In various embodiments, the computing device 900 may comprise an expansion slot to support a multimedia and/or memory card, for example.

The memory and/or storage component(s) 904 represent one or more computer-readable media. The memory and/or storage component(s) 904 may be implemented using any computer-readable media capable of storing data such as volatile or non-volatile memory, removable or non-removable memory, erasable or non-erasable memory, writeable or re-writeable memory, and so forth. The memory and/or storage component(s) 904 may comprise volatile media (e.g., random access memory (RAM)) and/or nonvolatile media (e.g., read only memory (ROM), Flash memory, optical disks, magnetic disks and the like). The memory and/or storage component(s) 904 may comprise fixed media (e.g., RAM, ROM, a fixed hard drive, etc.) as well as removable media (e.g., a Flash memory drive, a removable hard drive, an optical disk, etc.). Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The one or more I/O devices 906 allow a user to enter commands and information to the computing device 900, and also allow information to be presented to the user and/or other components or devices. Examples of input devices include a keyboard, a cursor control device (e.g., a mouse), a microphone, a scanner and the like. Examples of output devices include a display device (e.g., a monitor or projector, speakers, a printer, a network card, etc.). The computing device 900 may comprise an alphanumeric keypad coupled to the processing unit 902. The keypad may comprise, for example, a QWERTY key layout and/or an integrated number dial pad. The computing device 900 may comprise a display coupled to the processing unit 902. The display may comprise any suitable visual interface for displaying content to a user of the computing device 900. In one embodiment, for example, the display may be implemented by a liquid crystal display (LCD) such as a touch-sensitive color (e.g., 76-bit color) thin-film transistor (TFT) LCD screen. The touch-sensitive LCD may be used with the tip of a finger or a stylus and/or a handwriting recognizer program.

The processing unit 902 may be arranged to provide processing or computing resources to the computing device 900. For example, the processing unit 902 may be responsible for executing various software programs including system programs such as operating system (OS) and application programs. System programs generally may assist in the running of the computing device 900 and may be directly responsible for controlling, integrating, and managing the individual hardware components of the computer system. The OS may be implemented, for example, as a Microsoft® Windows OS, Symbian OS™, Embedix OS, Linux OS, Binary Run-time Environment for Wireless (BREW) OS, JavaOS, Android OS, Apple OS or other suitable OS in accordance with the described embodiments. The computing device 900 may comprise other system programs such as device drivers, programming tools, utility programs, software libraries, application programming interfaces (APIs), and so forth.

The computer 900 also includes a network interface 910 coupled to the bus 908. The network interface 910 provides a two-way data communication coupling to a local network 912. For example, the network interface 910 may be a digital subscriber line (DSL) modem, satellite dish, an integrated services digital network (ISDN) card or other data communication connection to a corresponding type of telephone line. As another example, the communication interface 910 may be a local area network (LAN) card effecting a data communication connection to a compatible LAN. Wireless communication means such as internal or external wireless modems may also be implemented.

In any such implementation, the network interface 910 sends and receives electrical, electromagnetic or optical signals that carry digital data streams representing various types of information, such as a selection of goods to be purchased, the information for payment of such purchase, or the address for delivery of the goods. The network interface 910 typically provides data communication through one or more networks to other data devices. For example, the network interface 910 may effect a connection through the local network to an Internet Service Provider (ISP) or to data equipment operated by an ISP. The ISP in turn provides data communication services through the internet (or other packet-based wide area network). The local network and the internet both use electrical, electromagnetic or optical signals that carry digital data streams. The signals through the various networks and the signals on the network interface 910, which carry the digital data to and from the computer system 900, are exemplary forms of carrier waves transporting the information.

The computer 900 can send messages and receive data, including program code, through the network(s) and the network interface 910. In the Internet example, a server might transmit a requested code for an application program through the internet, the ISP, the local network (the network 912) and the network interface 910. The received code may be executed by processor 904 as it is received, and/or stored in storage device 904, or other non-volatile storage for later execution. In this manner, computer 900 may obtain application code in the form of a carrier wave.

Various embodiments may be described herein in the general context of computer executable instructions, such as software, program modules, and/or engines being executed by a computer. Generally, software, program modules, and/or engines include any software element arranged to perform particular operations or implement particular abstract data types. Software, program modules, and/or engines can include routines, programs, objects, components, data structures and the like that perform particular tasks or implement particular abstract data types. An implementation of the software, program modules, and/or engines components and techniques may be stored on and/or transmitted across some form of computer-readable media. In this regard, computer-readable media can be any available medium or media useable to store information and accessible by a computing device. Some embodiments also may be practiced in distributed computing environments where operations are performed by one or more remote processing devices that are linked through a communications network. In a distributed computing environment, software, program modules, and/or engines may be located in both local and remote computer storage media including memory storage devices.

Although some embodiments may be illustrated and described as comprising functional components, software, engines, and/or modules performing various operations, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various operations of one or more embodiments. In various embodiments, for example, the article of manufacture may comprise a magnetic disk, optical disk, flash memory or firmware containing computer program instructions suitable for execution by a general purpose processor or application specific processor. The embodiments, however, are not limited in this context.

While various details have been set forth in the foregoing description, it will be appreciated that the various embodiments of the apparatus, system, and method for optimized code table signaling may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities.

Unless specifically stated otherwise as apparent from the foregoing discussion, it is appreciated that, throughout the foregoing description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

Some or all of the embodiments described herein may generally comprise technologies which can be implemented, individually, and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

Various aspects of the subject matter described herein are set out in the following numbered clauses:

Optimized Data Transfer Utilizing Optimized Code Table Signaling

1. A computer-implemented method comprising: receiving, by a processor, a digital bit stream; transforming, by the processor, the digital bit stream to an encoded digital bit stream, wherein the encoded digital bit stream comprises at least one of a gateway channel, a composite channel, or a data channel, and any combination thereof; and providing, by the processor, the encoded digital bit stream to a transmission system for transmission.

2. The computer-implemented method of clause 1, wherein transforming the digital bit stream comprises applying, by the processor, an m-element vector table to the digital bit stream.

3. The computer-implemented method of clause 2, wherein applying the m-element vector table to the digital bit stream comprises performing, by the processor, a table lookup for the digital bit stream.

4. The computer-implemented method of clause 2, wherein applying the m-element vector table to the digital bit stream comprises mapping, by the processor, the m-element table to the digital bit stream according to a mapping function.

5. The computer-implemented method of clause 1, comprising employing, by the processor, the m-element vector table to manage at least one of a bit error rate (BER), realized data throughput, bit energy, or signal range, and any combination thereof, to provide optimized performance.

6. The computer-implemented method of clause 1, comprising managing, by the processor, one or more tasks to enhance data transfer performance to provide an industry-standards agnostic interface to an existing digital communications system.

7. The computer-implemented method of clause 1, comprising, interleaving, by the processor, a data vector and the composite channel utilizing the gateway channel and a gateway mask.

8. The computer-implemented method of clause 1, comprising: generating, by the processor, a plurality of additional bits, wherein the plurality of additional bits are generated by error correcting code; and adding, by the processor, the plurality of additional bits to the encoded digital bit stream.

9. The computer-implemented method of clause 1, comprising implementing, by the processor, at least one of bit position partitioning, table partitioning, or a combination thereof, to generate blended partitioning for the m-element vector table to optimize data transfer.

10. A system comprising: a communications interface; a processor; and a non-transient memory medium operatively coupled to the processor, wherein the memory medium is configured to store a plurality of instructions configured to program the processor to: receive a digital bit stream; transform the digital bit stream to an encoded digital bit stream, wherein the encoded digital bit stream comprises at least one of a gateway channel, a composite channel, or a data channel, and any combination thereof; and provide the encoded digital bit stream to the communications interface for transmission.

11. The system of clause 10, wherein transforming the digital bit stream comprises applying an m-element vector table to the digital bit stream.

12. The system of clause 11, wherein applying the m-element vector table to the digital bit stream comprises performing a table lookup for the digital bit stream.

13. The system of clause 10, wherein the processor is further configured to employ the m-element vector table to manage at least one of a bit error rate (BER), realized data throughput, bit energy, or signal range, and any combination thereof, to provide optimized performance.

14. The system of clause 10, wherein the processor is further configured to manage one or more tasks to enhance data transfer performance to provide an industry-standards agnostic interface to an existing digital communications system.

15. The system of clause 10, wherein the processor is further configured to interleave a data vector and the composite channel utilizing the gateway channel and a gateway mask.

16. The system of clause 10, wherein the processor is further configured to: generate a plurality of additional bits, wherein the plurality of additional bits are generated by error correcting code; and add the plurality of additional bits to the encoded digital bit stream.

17. The system of clause 10, wherein the communications interface comprises a radio frequency (RF) communication system.

18. A non-transitory computer-readable memory medium configured to store instructions thereon that when loaded by a processor cause the processor to: receive a digital bit stream; transform the digital bit stream to an encoded digital bit stream, wherein the encoded digital bit stream comprises at least one of a gateway channel, a composite channel, or a data channel, and any combination thereof; and provide the encoded digital bit stream to the communications interface for transmission.

19. The non-transitory computer-readable memory medium of clause 18, wherein transforming the digital bit stream comprises applying an m-element vector table to the digital bit stream.

20. The non-transitory computer-readable memory medium of clause 19, wherein applying the m-element vector table to the digital bit stream comprises performing a table lookup for the digital bit stream.

21. The non-transitory computer-readable memory medium of clause 18, wherein the instructions stored thereon further cause the processor to employ the m-element vector table to manage at least one of a bit error rate (BER), realized data throughput, bit energy, or signal range, and any combination thereof, to provide optimized performance.

Enhanced Signal Integrity and Communication Utilizing Optimized Code Table Signaling 1. A computer-implemented method comprising: receiving, by a processor, a digital bit stream; transforming, by the processor, the digital bit stream to an encoded digital bit stream, wherein the encoded digital bit stream comprises at least one of a gateway channel, a composite channel, or a data channel, and any combination thereof; providing, by the processor, the encoded digital bit stream to a transmission system for transmission; and establishing, by the processor, signal integrity by utilizing pre-coordinated, pre-distributed information to limit the transmission to an intended sender-receiver pair, wherein the intended sender-receiver pair comprises the pre-coordinated, pre-distributed information.

2. The computer-implemented method of clause 1, comprising maintaining, by the processor, the signal integrity by utilizing the pre-coordinated, pre-distributed information.

3. The computer-implemented method of clause 1, comprising limiting, by the processor, the transmission to the intended sender and receiver by uniquely formatting the encoded digital bit stream prior to transmission.

4. The computer-implemented method of clause 1, wherein transforming the digital bit stream comprises applying, by the processor, an m-element vector table to the digital bit stream.

5. The computer-implemented method of clause 4, wherein applying the m-element vector table to the digital bit stream comprises performing, by the processor, a table lookup for the digital bit stream.

6. The computer-implemented method of clause 4, wherein applying the m-element vector table to the digital bit stream comprises mapping, by the processor, the m-element table to the digital bit stream according to a mapping function.

7. The computer-implemented method of clause 1, comprising employing, by the processor, the m-element vector table to manage at least one of a bit error rate (BER), realized data throughput, bit energy, or signal range, and any combination thereof, to provide enhanced signal integrity and communication.

8. The computer-implemented method of clause 1, comprising managing, by the processor, one or more tasks to enhance signal integrity and communication to provide an industry-standards agnostic interface to an existing digital communications system.

9. The computer-implemented method of clause 1, comprising, interleaving, by the processor, a data vector and the composite channel utilizing the gateway channel and a gateway mask.

10. The computer-implemented method of clause 1, comprising: generating, by the processor, a plurality of additional bits, wherein the plurality of additional bits are generated by error correcting code; and adding, by the processor, the plurality of additional bits to the encoded digital bit stream.

11. The computer-implemented method of clause 1, comprising implementing, by the processor, at least one of bit position partitioning, table partitioning, or a combination thereof, to generate blended partitioning for the m-element vector table to enhance signal integrity and communication.

12. A system comprising: a communications interface; a processor; and a non-transient memory medium operatively coupled to the processor, wherein the memory medium is configured to store a plurality of instructions configured to program the processor to: receive a digital bit stream; transform the digital bit stream to an encoded digital bit stream, wherein the encoded digital bit stream comprises at least one of a gateway channel, a composite channel, or a data channel, and any combination thereof; provide the encoded digital bit stream to the communications interface for transmission; and establish signal integrity by utilizing pre-coordinated, pre-distributed information to limit the transmission to an intended sender-receiver pair, wherein the intended sender-receiver pair comprises the pre-coordinated, pre-distributed information.

13. The computer-implemented method of clause 12, wherein the processor is further configured to maintain the signal integrity by utilizing the pre-coordinated, pre-distributed information.

14. The computer-implemented method of clause 12, wherein the processor is further configured to limit the transmission to the intended sender and receiver by uniquely formatting the encoded digital bit stream prior to transmission.

15. The system of clause 12, wherein transforming the digital bit stream comprises applying an m-element vector table to the digital bit stream.

16. The system of clause 12, wherein the processor is further configured to employ the m-element vector table to manage at least one of a bit error rate (BER), realized data throughput, bit energy, or signal range, and any combination thereof, to provide enhanced signal integrity and communication.

17. The system of clause 12, wherein the processor is further configured to manage one or more tasks to enhance signal integrity and communication to provide an industry-standards agnostic interface to an existing digital communications system.

18. The system of clause 12, wherein the processor is further configured to: generate a plurality of additional bits, wherein the plurality of additional bits are generated by error correcting code; and add the plurality of additional bits to the encoded digital bit stream.

19. The system of clause 12, wherein the communications interface comprises a bound communication system.

20. The system of clause 12, wherein the communications interface comprises an unbound communication system.

21. A non-transitory computer-readable memory medium configured to store instructions thereon that when loaded by a processor cause the processor to: receive a digital bit stream; transform the digital bit stream to an encoded digital bit stream, wherein the encoded digital bit stream comprises at least one of a gateway channel, a composite channel, or a data channel, and any combination thereof; provide the encoded digital bit stream to the communications interface for transmission; establish signal integrity by utilizing pre-coordinated, pre-distributed information to limit the transmission to an intended sender-receiver pair, wherein the intended sender-receiver pair comprises the pre-coordinated, pre-distributed information; maintain the signal integrity by utilizing the pre-coordinated, pre-distributed information; and limit the transmission to the intended sender and receiver by uniquely formatting the encoded digital bit stream prior to transmission.

Dynamic Control of Quality of Service (QOS) Using Derived Qos Measures

1. A computer-implemented method comprising: receiving, by a processor, a digital bit stream; transforming, by the processor, the digital bit stream to an encoded digital bit stream, wherein the encoded digital bit stream comprises at least one of a gateway channel, a composite channel, or a data channel, and any combination thereof; providing, by the processor, the encoded digital bit stream to a transmission system for transmission; and enabling, by the processor, dynamic control of QOS through the use of derived QOS measures allowing coordinated changes to pre-coordinated, pre-distributed information, which were intended to limit the transmission to an intended sender-receiver pair, wherein the intended sender-receiver pair is uniquely able to coordinate, distribute information to allow continued transmission and receipt of a digital bit with necessary QOS for communication.

2. The computer-implemented method of clause 1, comprising maintaining, by the processor, dynamic control of QOS through the use of derived QOS measures allowing coordinated changes to pre-coordinated, pre-distributed information.

3. The computer-implemented method of clause 1, comprising dynamic control of QOS through the use of derived QOS measures, by the processor, limiting the transmission to the intended sender and receiver by uniquely coordinating changes to the encoded digital bit stream prior to transmission.

4. The computer-implemented method of clause 1, wherein transforming the digital bit stream comprises changing, by the processor, an m-element vector table to be applied to the digital bit stream.

5. The computer-implemented method of clause 4, wherein changing and applying the m-element vector table to the digital bit stream comprises performing, by the processor, a table lookup for the digital bit stream.

6. The computer-implemented method of clause 4, wherein changing and applying the m-element vector table to the digital bit stream comprises mapping, by the processor, the m-element table to the digital bit stream according to a mapping function.

7. The computer-implemented method of clause 1, comprising employing, by the processor, changes to the m-element vector table to manage at least one of service response time, loss, signal-to-noise ratio, crosstalk, echo, interrupts, frequency response, loudness levels, a required bit rate, delay, jitter, packet dropping probability and/or bit error rate, data rate and delay, and dynamically control scheduling priorities, other QOS measures known to one skilled in the art and any combination thereof, to dynamic control of QOS through the use of derived QOS measures.

8. The computer-implemented method of clause 1, comprising managing, by the processor, one or more tasks to enhance QOS dynamically through the use of derived QOS measures to provide an industry-standards agnostic interface to an existing digital communications system.

9. The computer-implemented method of clause 1, comprising dynamic changes to, interleaving, by the processor, a data vector and the composite channel utilizing the gateway channel and a gateway mask.

10. The computer-implemented method of clause 1, comprising: generating, by the processor, a plurality of additional bits, wherein the plurality of additional bits are generated by evaluating derived measures of QOS; and adding, by the processor, the plurality of additional bits to the encoded digital bit stream; and changing, by the processor, the additional bits, as necessary to maintain the desired QOS for the encoded digital bit stream.

11. The computer-implemented method of clause 1, comprising implementing, by the processor, at least one of bit position partitioning, table partitioning, or a combination thereof, to generate blended partitioning for the m-element vector table to dynamic control of QOS through the use of derived QOS measures.

12. A system comprising: a communications interface; a processor; and a non-transient memory medium operatively coupled to the processor, wherein the memory medium is configured to store a plurality of instructions configured to program the processor to: receive a digital bit stream; transform the digital bit stream to an encoded digital bit stream, wherein the encoded digital bit stream comprises at least one of a gateway channel, a composite channel, or a data channel, and any combination thereof; provide the encoded digital bit stream to the communications interface for transmission; and enabling, by the processor, dynamic control of QOS through the use of derived QOS measures allowing coordinated changes to pre-coordinated, pre-distributed information, which were intended to limit the transmission to an intended sender-receiver pair, wherein the intended sender-receiver pair is uniquely able to coordinate, distribute information to allow continued transmission and receipt of a digital bit with necessary QOS for communication.

13. The computer-implemented method of clause 12, wherein the processor is further configured to dynamic control of QOS through the use of derived QOS measures allowing coordinated changes to pre-coordinated, pre-distributed information, which were intended to limit the transmission to an intended sender-receiver pair.

14. The computer-implemented method of clause 12, wherein the processor is further configured to limit communication of the coordinated changes to the intended sender and receiver by uniquely formatting the encoded digital bit stream prior to transmission.

15. The system of clause 12, wherein transforming the digital bit stream comprises communicating changes to an m-element vector table to be applied to the digital bit stream.

16. The system of clause 12, wherein the processor is further configured to employ the m-element vector table to manage at least one of service response time, loss, signal-to-noise ratio, crosstalk, echo, interrupts, frequency response, loudness levels, a required bit rate, delay, jitter, packet dropping probability and/or bit error rate, data rate and delay, and dynamically control scheduling priorities, other QOS measures known to one skilled in the art and any combination thereof, to dynamic control of QOS through the use of derived QOS measures.

17. The system of clause 12, wherein the processor is further configured to manage one or more tasks to enhance QOS dynamically through the use of derived QOS measures to provide an industry-standards agnostic interface to an existing digital communications system.

18. The system of clause 12, wherein the processor is further configured to: generate a plurality of additional bits, wherein the plurality of additional bits are generated by evaluating derived measures of QOS; and add the plurality of additional bits to the encoded digital bit stream; and change the additional bits, as necessary to maintain the desired QOS for the encoded digital bit stream.

19. The system of clause 12, wherein the communications interface comprises a bound communication system.

20. The system of clause 12, wherein the communications interface comprises an unbound communication system.

21. A non-transitory computer-readable memory medium configured to store instructions thereon that when loaded by a processor cause the processor to: receive a digital bit stream; transform the digital bit stream to an encoded digital bit stream, wherein the encoded digital bit stream comprises at least one of a gateway channel, a composite channel, or a data channel, and any combination thereof; provide the encoded digital bit stream to the communications interface for transmission; establish QOS by utilizing pre-coordinated, pre-distributed information to limit the transmission to an intended sender-receiver pair, wherein the intended sender-receiver pair comprises the pre-coordinated, pre-distributed information; maintain dynamic control of QOS through the use of derived QOS measures by changing and communicating coordinated, distributed information; and limit the transmission to the intended sender and receiver by uniquely coordinating changes to the encoded digital bit stream prior to transmission.

Authentication of a Subscribed Code Table User Utilizing Optimized Code Table Signaling 1. A computer-implemented method comprising: receiving, by a processor, a digital bit stream; transforming, by the processor, the digital bit stream to an encoded digital bit stream, wherein the encoded digital bit stream comprises at least one of a gateway channel, a composite channel, or a data channel, and any combination thereof; providing, by the processor, the encoded digital bit stream to a transmission system for transmission; and enabling, by the processor, authentication through the use of pre-coordinated, pre-distributed information, which were intended to limit the transmission to an intended sender-receiver pair, wherein the intended sender-receiver pair is uniquely able to coordinate, distribute information to allow continued transmission and receipt of a digital bit for communication.

2. The computer-implemented method of clause 1, comprising maintaining, by the processor, authentication by allowing coordinated changes to pre-coordinated, pre-distributed information.

3. The computer-implemented method of clause 1, authentication through the use of pre-coordinated, pre-distributed information, by the processor, limiting the transmission to the intended sender and receiver by uniquely coordinating changes to the encoded digital bit stream prior to transmission.

4. The computer-implemented method of clause 1, wherein transforming the digital bit stream comprises changing, by the processor, an m-element vector table to be applied to the digital bit stream.

5. The computer-implemented method of clause 4, wherein changing and applying the m-element vector table to the digital bit stream comprises performing, by the processor, a table lookup for the digital bit stream.

6. The computer-implemented method of clause 4, wherein changing and applying the m-element vector table to the digital bit stream comprises mapping, by the processor, the m-element table to the digital bit stream according to a mapping function.

7. The computer-implemented method of clause 1, comprising authentication of the sender-receiver pair, by the processor, the transmission to the intended sender and receiver by uniquely coordinating changes to the encoded digital bit stream prior to transmission.

8. The computer-implemented method of clause 1, comprising managing, by the processor, one or more tasks to authenticate the sender-receiver pair by uniquely coordinating changes to the encoded digital bit stream prior to transmission.

9. The computer-implemented method of clause 1, comprising dynamic changes to, interleaving, by the processor, a data vector and the composite channel utilizing the gateway channel and a gateway mask.

10. The computer-implemented method of clause 1, comprising: generating, by the processor, a plurality of additional bits, wherein the plurality of additional bits are generated to enhance and continue authentication of the sender-receiver pair; and adding, by the processor, the plurality of additional bits to the encoded digital bit stream; and changing, by the processor, the additional bits, as necessary to maintain the desired authentication of the sender-receiver pair.

11. The computer-implemented method of clause 1, comprising implementing, by the processor, at least one of bit position partitioning, table partitioning, or a combination thereof, to generate blended partitioning for the m-element vector table to authenticate the sender-receiver pair.

12. A system comprising: a communications interface; a processor; and a non-transient memory medium operatively coupled to the processor, wherein the memory medium is configured to store a plurality of instructions configured to program the processor to: receive a digital bit stream; transform the digital bit stream to an encoded digital bit stream, wherein the encoded digital bit stream comprises at least one of a gateway channel, a composite channel, or a data channel, and any combination thereof; provide the encoded digital bit stream to the communications interface for transmission; and enabling, by the processor, authentication through the use of pre-coordinated, pre-distributed information, which were intended to limit the transmission to an intended sender-receiver pair, wherein the intended sender-receiver pair is uniquely able to coordinate, distribute information to allow continued transmission and receipt of a digital bit for communication.

13. The computer-implemented method of clause 12, wherein the processor is further configured to authenticate the sender-receiver pair allowing coordinated changes to pre-coordinated, pre-distributed information, which were intended to limit the transmission to an intended sender-receiver pair.

14. The computer-implemented method of clause 12, wherein the processor is further configured to limit communication of the coordinated changes to the intended sender and receiver by uniquely formatting the encoded digital bit stream prior to transmission.

15. The system of clause 12, wherein transforming the digital bit stream comprises communicating changes to an m-element vector table to be applied to the digital bit stream.

16. The system of clause 12, wherein the processor is further configured to employ the m-element vector table to manage the authentication of the sender-receiver pair, by the processor, the transmission to the intended sender and receiver by uniquely coordinating changes to the encoded digital bit stream prior to transmission.

17. The system of clause 12, wherein the processor is further configured to manage, by the processor, one or more tasks to authenticate the sender-receiver pair by uniquely coordinating changes to the encoded digital bit stream prior to transmission.

18. The system of clause 12, wherein the processor is further configured to: generate a plurality of additional bits, wherein the plurality of additional bits are generated to authenticate the sender-receiver pair; and add the plurality of additional bits to the encoded digital bit stream; and change the additional bits, as necessary to maintain authentication of the sender-receiver pair.

19. The system of clause 12, wherein the communications interface comprises a bound communication system.

20. The system of clause 12, wherein the communications interface comprises an unbound communication system.

21. A non-transitory computer-readable memory medium configured to store instructions thereon that when loaded by a processor cause the processor to: receive a digital bit stream; transform the digital bit stream to an encoded digital bit stream, wherein the encoded digital bit stream comprises at least one of a gateway channel, a composite channel, or a data channel, and any combination thereof; provide the encoded digital bit stream to the communications interface for transmission; establish authentication of the sender-receiver pair by utilizing pre-coordinated, pre-distributed information to limit the transmission to an intended sender-receiver pair, wherein the intended sender-receiver pair comprises the pre-coordinated, pre-distributed information; maintain dynamic control of authentication of the sender-receiver pair by changing and communicating coordinated, distributed information; and limit the transmission to the intended sender and receiver by uniquely coordinating changes to the encoded digital bit stream prior to transmission.

What is claimed is:

1. A computer-implemented method comprising:
   receiving, by a processor, a digital bit stream;
   transforming, by the processor, the digital bit stream to an encoded digital bit stream, wherein the encoded digital bit stream comprises a gateway channel and at least one of a composite channel or a data channel, wherein the gateway channel comprises information to allow a member user into a protected communication system;
   providing, by the processor, the encoded digital bit stream to a transmission system for transmission;
   enabling, by the processor, authentication by utilizing optimized code table signaling by encoding the digital bit stream using pre-coordinated, pre-distributed information that identifies at least one intended sender-receiver pair;
   generating, by the processor, a plurality of additional authentication bits, wherein the plurality of additional authentication bits are generated to modify the effectiveness of authenticating the at least one intended sender-receiver pair;
   adding, by the processor, the plurality of additional authenticating bits to the encoded digital bit stream; and
   changing, by the processor, the additional authentication bits, as necessary, to maintain a desired authentication of the at least one intended sender-receiver pair.

2. The computer-implemented method of claim 1, further comprising:
   maintaining, by the processor, authentication by allowing coordinated changes to the pre-coordinated, pre-distributed information.

3. The computer-implemented method of claim 2, wherein the coordinated changes to the pre-coordinated, pre-distributed information are made, by the processor, prior to transmission.

4. The computer-implemented method of claim 1, wherein transforming the digital bit stream comprises changing, by the processor, an m-element vector table and applying, by the processor, the m-element vector table to the digital bit stream.

5. The computer-implemented method of claim 4, wherein applying the m-element vector table comprises performing, by the processor, a table lookup for the digital bit stream.

6. The computer-implemented method of claim 4, wherein applying the m-element vector table comprises mapping, by the processor, the m-element vector table to the digital bit stream according to a mapping function.

7. The computer-implemented method of claim 1, further comprising:
   enabling, by the processor, authentication of the transmission to the at least one intended sender-receiver pair by uniquely coordinating changes to the encoded digital bit stream prior to transmission.

8. The computer-implemented method of claim 1, further comprising:
   managing, by the processor, one or more tasks to authenticate the at least one intended sender-receiver pair by uniquely coordinating changes to the encoding of the encoded digital bit stream prior to transmission.

9. The computer-implemented method of claim 1, wherein the encoded digital bit stream comprises the composite channel, and the method further comprising:
   interleaving, by the processor, a data vector and the composite channel utilizing the gateway channel and a gateway mask.

10. The computer-implemented method of claim 1, further comprising:
    implementing, by the processor, at least one of bit position partitioning or table partitioning to authenticate the at least one sender-receiver pair.

11. A data communication system comprising:
    a communications interface;
    a processor; and
    a non-transient memory medium operatively coupled to the processor, wherein the non-transient memory medium is configured to store a plurality of instructions configured to program the processor to:
    receive a digital bit stream;

transform the digital bit stream to an encoded digital bit stream, wherein the encoded digital bit stream comprises a gateway channel and at least one of a composite channel or a data channel, wherein the gateway channel comprises information to allow a member user into a protected communication system;

provide the encoded digital bit stream to the communications interface for transmission;

enable authentication by utilizing optimized code table signaling by encoding the digital bit stream using pre-coordinated, pre-distributed information that identifies at least one intended sender-receiver pair;

generating, by the processor, a plurality of additional authentication bits, wherein the plurality of additional authentication bits are generated to modify the effectiveness of authenticating the a least one intended sender-receiver pair;

adding, by the processor, the plurality of additional authentication bits to the encoded digital bit stream; and changing, by the processor, the additional authentication bits, as necessary, to maintain a desired authentication of the at least one intended sender-receiver pair.

12. The system of claim 11, wherein the processor is further configured to allow coordinated changes to the pre-coordinated, pre-distributed information.

13. The system of claim 12, wherein the processor is further configured to limit communication of the coordinated changes to the at least one intended sender-receiver pair by uniquely formatting the encoded digital bit stream prior to transmission.

14. The system of claim 11, wherein the processor is further configured to transform the digital bit stream comprises communicating changes to an m-element vector table to be applied to the digital bit stream.

15. The system of claim 11, wherein the processor is further configured to manage one or more tasks to authenticate the at least one intended sender-receiver pair by uniquely coordinating changes to the encoding of the encoded digital bit stream prior to transmission.

16. The system of claim 15, wherein the one or more tasks are being employed by the m-element vector table.

17. The system of claim 11, wherein the communications interface comprises a bound communication system.

18. The system of claim 11, wherein the communications interface comprises an unbound communication system.

19. A non-transitory computer-readable memory medium configured to store instructions thereon that when loaded by a processor cause the processor to:

receive a digital bit stream;

transform the digital bit stream to an encoded digital bit stream, wherein the encoded digital bit stream comprises a gateway channel and at least one of a composite channel or a data channel, wherein the gateway channel comprises information to allow a member user into a protected communication system;

provide the encoded digital bit stream to a communications interface for transmission;

establish authentication by utilizing optimized code table signaling by encoding the digital bit stream using pre-coordinated, pre-distributed information that identifies at least one intended sender-receiver pair;

generate a plurality of additional authentication bits, wherein the plurality of additional authentication bits are generated to modify the effectiveness of authenticating the at least one intended sender-receiver pair;

add the plurality of additional authentication bits to the encoded digital bit stream;

change the additional authentication bits, as necessary, to maintain a desired authentication of the at least one intended sender-receiver pair; and coordinate the changes to the pre-coordinated, pre-distributed information prior to transmission.

* * * * *